United States Patent
Leiber et al.

(10) Patent No.: US 12,296,810 B2
(45) Date of Patent: May 13, 2025

(54) HYDRAULIC SYSTEM HAVING AT LEAST TWO HYDRAULIC CIRCUITS AND TWO PRESSURE SUPPLY DEVICES

(71) Applicant: IPGATE AG, Pfäffikon (CH)

(72) Inventors: Thomas Leiber, Rogoznica (HR);
Heinz Leiber, Oberriexingen (DE);
Anton Van Zanten, Ditzingen (DE)

(73) Assignee: IPGATE AG, Pfäffikon (CH)

( * ) Notice: Subject to any disclaimer, the term of this patent is extended or adjusted under 35 U.S.C. 154(b) by 717 days.

(21) Appl. No.: 17/429,403

(22) PCT Filed: Jul. 10, 2019

(86) PCT No.: PCT/EP2019/068596
§ 371 (c)(1),
(2) Date: Aug. 9, 2021

(87) PCT Pub. No.: WO2020/164755
PCT Pub. Date: Aug. 20, 2020

(65) Prior Publication Data
US 2022/0144231 A1    May 12, 2022

(30) Foreign Application Priority Data
Feb. 12, 2019   (DE) ............... 20 2019 101 596.9

(51) Int. Cl.
*B60T 8/32*   (2006.01)
*B60T 8/40*   (2006.01)
(Continued)

(52) U.S. Cl.
CPC ............... *B60T 8/326* (2013.01); *B60T 8/40* (2013.01); *B60T 8/4022* (2013.01);
(Continued)

(58) Field of Classification Search
CPC ...... B60T 8/326; B60T 8/4081; B60T 8/4022; B60T 8/4054; B60T 13/142;
(Continued)

(56) References Cited

U.S. PATENT DOCUMENTS 5,588,718 A   12/1996   Winner et al.
5,986,368 A   11/1999   Wetzel et al.
(Continued)

FOREIGN PATENT DOCUMENTS

CN   101039829       9/2007
CN   101341056 A     1/2009
(Continued)

OTHER PUBLICATIONS

Notice of Allowance issued Jan. 24, 2024 in U.S. Appl. No. 17/429,608.
(Continued)

*Primary Examiner* — Pamela Rodriguez
(74) *Attorney, Agent, or Firm* — Panitch Schwarze Belisario & Nadel LLP

(57) ABSTRACT

Apparatus for generating braking force in a vehicle brake system has at least two pressure supply devices and first and second hydraulic brake circuits, each having at least one or two hydraulic wheel brakes. Pressure in at least one brake circuit can be both built up and released by the pressure supply devices, which include a piston pump or gear pump driven by an electric motor drive and deliver continuous volume. At least one valve arrangement may adjust wheel brake pressures individually and/or disconnect/connect the wheel brakes from/to a brake circuit and/or a pressure supply device. At least one electronic control unit enables open-loop and closed-loop control. Pressure increase is enabled in one or both brake circuits, independently or in combination, using first and/or second pressure supply
(Continued)

Figure 1:
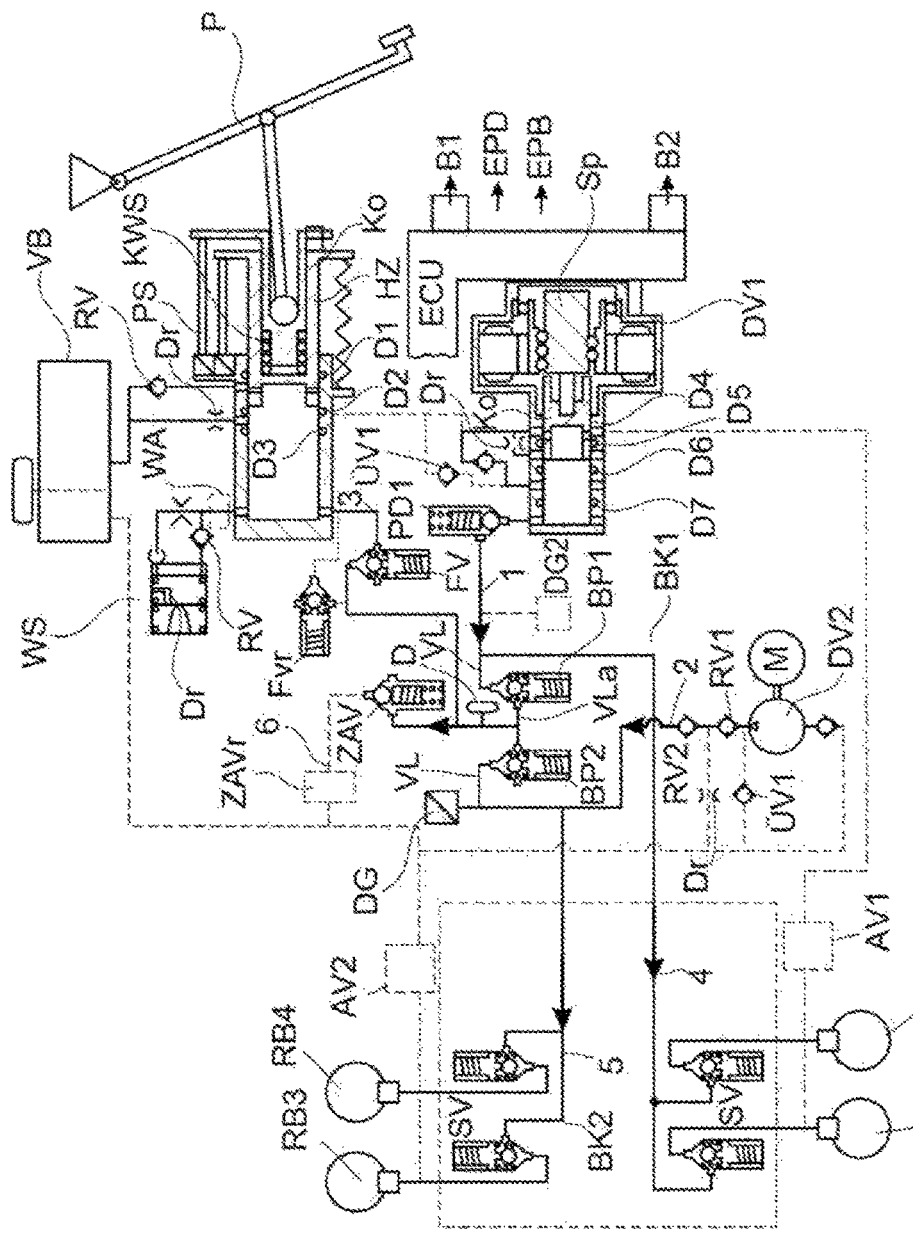

devices that produce changes in pressure simultaneously or temporally offset or overlapping.

14 Claims, 11 Drawing Sheets

(51) Int. Cl.
    *B60T 13/14*     (2006.01)
    *B60T 13/68*     (2006.01)
    *F15B 11/17*     (2006.01)
    *F15B 11/22*     (2006.01)
    *F15B 13/02*     (2006.01)
    *F15B 13/06*     (2006.01)

(52) U.S. Cl.
    CPC .......... *B60T 8/4054* (2013.01); *B60T 8/4081* (2013.01); *B60T 13/686* (2013.01); *F15B 11/17* (2013.01); *F15B 11/22* (2013.01); *F15B 13/025* (2013.01); *F15B 13/06* (2013.01); *B60T 13/142* (2013.01); *B60T 2270/402* (2013.01)

(58) Field of Classification Search
    CPC .... B60T 13/686; B60T 2270/402; B60T 8/40; F15B 11/17; F15B 11/22; F15B 13/025; F15B 13/06
    See application file for complete search history.

(56) References Cited

U.S. PATENT DOCUMENTS

| | | | |
|---|---|---|---|
| 5,988,767 | A | 11/1999 | Inoue et al. |
| 6,042,200 | A | 3/2000 | Hosoya et al. |
| 6,517,170 | B1 | 2/2003 | Hofsaess et al. |
| 9,776,604 | B2 | 10/2017 | Lee et al. |
| 10,173,659 | B2 | 1/2019 | Kim et al. |
| 10,513,249 | B2 | 12/2019 | Kim |
| 10,688,979 | B2 | 6/2020 | Leiber et al. |
| 11,554,765 | B2 | 1/2023 | Leiber et al. |
| 11,565,678 | B2 | 1/2023 | Zander et al. |
| 2008/0246334 | A1 | 10/2008 | Drescher |
| 2009/0115247 | A1 | 5/2009 | Leiber et al. |
| 2010/0001577 | A1 | 1/2010 | Hatano |
| 2012/0235469 | A1 | 9/2012 | Miyazaki et al. |
| 2013/0103277 | A1 | 4/2013 | Attallah et al. |
| 2013/0213025 | A1 | 8/2013 | Linden |
| 2014/0203626 | A1 | 7/2014 | Biller et al. |
| 2014/0216866 | A1 | 8/2014 | Feigel et al. |
| 2015/0203085 | A1 | 7/2015 | Maruo et al. |
| 2015/0283987 | A1 | 10/2015 | Bareiss |
| 2016/0009263 | A1 | 1/2016 | Feigel et al. |
| 2016/0009267 | A1 | 1/2016 | Lesinski, Jr. |
| 2016/0023644 | A1 | 1/2016 | Feigel et al. |
| 2016/0107629 | A1 | 4/2016 | Han |
| 2016/0185329 | A1 | 6/2016 | Lee et al. |
| 2016/0221562 | A1 | 8/2016 | Leiber et al. |
| 2016/0311422 | A1 | 10/2016 | van Zanten et al. |
| 2016/0375886 | A1 | 12/2016 | Jung |
| 2017/0015293 | A1 | 1/2017 | Yagashira et al. |
| 2017/0106843 | A1 | 4/2017 | Jeong |
| 2017/0158184 | A1 | 6/2017 | Choi et al. |
| 2017/0182988 | A1 | 6/2017 | Kawakami et al. |
| 2017/0327098 | A1 | 11/2017 | Leiber et al. |
| 2017/0334417 | A1 | 11/2017 | Choi et al. |
| 2017/0361825 | A1 | 12/2017 | Drumm et al. |
| 2018/0065605 | A1 | 3/2018 | Leiber et al. |
| 2018/0065609 | A1 | 3/2018 | Leiber et al. |
| 2018/0126970 | A1 | 5/2018 | Leiber et al. |
| 2018/0215366 | A1 | 8/2018 | Leiber et al. |
| 2018/0334149 | A1 | 11/2018 | Feigel |
| 2019/0031165 | A1 | 1/2019 | Besier et al. |
| 2019/0100182 | A1 | 4/2019 | Leiber et al. |
| 2019/0344769 | A1 | 11/2019 | Zimmermann et al. |
| 2020/0047731 | A1 | 2/2020 | Reuter |
| 2020/0079335 | A1 | 3/2020 | Linhoff et al. |
| 2020/0079338 | A1 | 3/2020 | Roh |
| 2020/0139948 | A1 | 5/2020 | Leiber et al. |
| 2020/0139949 | A1 | 5/2020 | Dolmaya et al. |
| 2020/0172068 | A1 | 6/2020 | Leiber et al. |
| 2020/0406880 | A1 | 12/2020 | Zimmermann et al. |
| 2021/0053540 | A1 | 2/2021 | Besier et al. |
| 2021/0094524 | A1 | 4/2021 | Wetzel |
| 2021/0179051 | A1 | 6/2021 | Alford et al. |
| 2021/0245725 | A1 | 8/2021 | Courth et al. |
| 2021/0309197 | A1 | 10/2021 | Weh et al. |
| 2022/0041150 | A1 | 2/2022 | Leiber |
| 2022/0135013 | A1 | 5/2022 | Leiber et al. |
| 2022/0314813 | A1* | 10/2022 | Koglsperger ......... B60T 13/146 |
| 2023/0356700 | A1 | 11/2023 | Jia et al. |
| 2024/0001899 | A1 | 1/2024 | Stanojkovski |

FOREIGN PATENT DOCUMENTS

| | | |
|---|---|---|
| CN | 101987616 A | 3/2011 |
| CN | 102414063 | 4/2012 |
| CN | 102616229 | 8/2012 |
| CN | 102639370 | 8/2012 |
| CN | 102822025 | 12/2012 |
| CN | 103253251 | 8/2013 |
| CN | 103318160 | 9/2013 |
| CN | 103347754 | 10/2013 |
| CN | 103874609 | 6/2014 |
| CN | 104640755 | 5/2015 |
| CN | 107107885 | 8/2017 |
| CN | 107428325 A | 12/2017 |
| CN | 107472232 | 12/2017 |
| DE | 4340467 A1 | 6/1995 |
| DE | 19914403 A1 | 10/2000 |
| DE | 10025038 A1 | 11/2001 |
| DE | 10028092 A1 | 12/2001 |
| DE | 10158065 | 6/2003 |
| DE | 10259489 A1 | 7/2004 |
| DE | 10319338 A1 | 11/2004 |
| DE | 102005017958 | 4/2006 |
| DE | 102005055751 A1 | 11/2006 |
| DE | 102007016948 | 8/2008 |
| DE | 102008015241 A1 | 9/2008 |
| DE | 102009008944 A1 | 8/2010 |
| DE | 102009055721 | 6/2011 |
| DE | 102011086258 A1 | 5/2012 |
| DE | 102012210809 A1 | 1/2013 |
| DE | 102012213216 A1 | 2/2013 |
| DE | 102012217825 A1 | 4/2014 |
| DE | 102012025290 A1 | 6/2014 |
| DE | 102013217954 A1 | 3/2015 |
| DE | 102013017205 A1 | 4/2015 |
| DE | 102013224783 A1 | 6/2015 |
| DE | 112013004634 T5 | 6/2015 |
| DE | 102014225962 | 6/2016 |
| DE | 202015008975 U1 | 6/2016 |
| DE | 102015103858 | 9/2016 |
| DE | 102015104246 A1 | 9/2016 |
| DE | 112015002162 T5 | 1/2017 |
| DE | 102016222765 A1 | 5/2017 |
| DE | 102016105232 A1 | 9/2017 |
| DE | 102016203563 A1 | 9/2017 |
| DE | 102016219257 A1 | 4/2018 |
| DE | 102016225537 A1 | 6/2018 |
| DE | 102017200955 A1 | 7/2018 |
| DE | 102017219598 A1 | 7/2018 |
| DE | 102017222435 A1 | 7/2018 |
| DE | 102017222450 A1 | 7/2018 |
| DE | 102017207954 A1 | 11/2018 |
| DE | 102017113563 A1 | 12/2018 |
| DE | 102017212016 A1 | 1/2019 |
| DE | 102018111126 A1 | 11/2019 |
| DE | 102019219158 A1 | 6/2021 |
| EP | 280740 A1 | 9/1988 |
| EP | 2881292 A1 | 6/2015 |
| EP | 2883766 A1 | 6/2015 |
| EP | 2744691 B1 | 7/2015 |
| EP | 3225480 A1 | 10/2017 |

(56) References Cited

FOREIGN PATENT DOCUMENTS

| | | |
|---|---|---|
| EP | 3225481 A1 | 10/2017 |
| EP | 3333031 A1 | 6/2018 |
| GB | 689075 | 6/1947 |
| GB | 8514135 | 7/1985 |
| GB | 2160273 | 12/1985 |
| GB | 8703148 | 2/1987 |
| GB | 2186932 A | 8/1987 |
| JP | H8-506301 A | 7/1996 |
| JP | H8282459 A | 10/1996 |
| JP | H10329699 A | 12/1998 |
| JP | H11-348751 A | 12/1999 |
| JP | 2001097201 | 4/2001 |
| JP | 2001219845 A | 8/2001 |
| JP | 20020337679 A | 11/2002 |
| JP | 2002541010 A | 12/2002 |
| JP | 2006-151342 A | 6/2006 |
| JP | 2013541462 A | 11/2013 |
| KR | 20090077182 | 7/2009 |
| KR | 20170012348 | 2/2017 |
| WO | 2006111393 A1 | 10/2006 |
| WO | 2012034661 | 3/2012 |
| WO | 2012059175 A1 | 5/2012 |
| WO | 2012146461 A1 | 11/2012 |
| WO | 2013010554 A1 | 1/2013 |
| WO | 2013037568 A1 | 3/2013 |
| WO | 2014135446 A2 | 9/2014 |
| WO | 2015024795 A1 | 2/2015 |
| WO | 2015032637 A1 | 3/2015 |
| WO | 2015106892 A1 | 7/2015 |
| WO | 2016012331 A1 | 1/2016 |
| WO | 2016023994 A1 | 2/2016 |
| WO | 2016023995 A1 | 2/2016 |
| WO | 2016120292 A1 | 8/2016 |
| WO | 2016146223 A2 | 9/2016 |
| WO | 2017055152 A1 | 4/2017 |
| WO | 2017148968 A1 | 9/2017 |
| WO | 2017153072 | 9/2017 |
| WO | 2018011021 A1 | 1/2018 |
| WO | 2018019671 A1 | 2/2018 |
| WO | 2018130406 A1 | 7/2018 |
| WO | 2018130482 A1 | 7/2018 |
| WO | 2018130483 A1 | 7/2018 |
| WO | 2018210534 A1 | 11/2018 |
| WO | 2018234387 A1 | 12/2018 |
| WO | 2019002475 A1 | 1/2019 |
| WO | 2019215283 A1 | 11/2019 |

OTHER PUBLICATIONS

Corrected Notice of Allowance issued Feb. 1, 2024 in U.S. Appl. No. 17/429,608.
Office Action issued Mar. 16, 2022 in U.S. Appl. No. 17/429,620.
Office Action issued Jan. 25, 2024 n European Aplication No. 20706153.2-1012 with English Translation.
Office Action issued Feb. 29, 2024 in U.S. Appl. No. 17/429,423.
Office Action issued Nov. 24, 2023 in U.S. Appl. No. 17/429,562.
Notice of Allowance issued Mar. 6, 2024 in U.S. Appl. No. 17/429,615.
Office Action issued Dec. 7, 2023 in U.S. Appl. No. 17/429,578.
Int'l Search Report and Written Opinion issued Oct. 22, 2019 in Int'l Application No. PCT/EP2019/068596, English translation of Int'l Search Report only.
Int'l Search Report and Written Opinion issued Oct. 30, 2019 in Int'l Application No. PCT/EP2019/057123, English translation of Int'l Search Report only.
Int'l Search Report and Written Opinion issued Apr. 1, 2020 in Int'l Application No. PCT/EP2020/053626, English translation of Int'l Search Report only.
Int'l Search Report and Written Opinion issued Nov. 4, 2019 in Int'l Application No. PCT/EP2019/068592, English translation of Int'l Search Report only.
Int'l Search Report and Written Opinion issued Apr. 28, 2020 in Int'l Application No. PCT/EP2020/053609, English translation of Int'l Search Report only.
Int'l Search Report and Written Opinion issued Apr. 28, 2020 in Int'l Application No. PCT/EP2020/053613, English translation of Int'l Search Report only.
Int'l Search Report and Written Opinion issued May 19, 2020 in Int'l Application No. PCT/EP2020/053655, English translation of Int'l Search Report only.
Int'l Search Report and Written Opinion issued May 19, 2020 in Int'l Application No. PCT/EP2020/053668, English translation of Int'l Search Report only.
Int'l Search Report and Written Opinion issued Jun. 5, 2020 in Int'l Application No. PCT/EP2020/053667, English translation of Int'l Search Report only.
Int'l Search Report and Written Opinion issued Oct. 9, 2020 in Int'l Application No. PCT/EP2020/053666, English translation of Int'l Search Report only.
Search Report issued Jan. 3, 2020 in DE Application No. 10 2019 103 483.3.
Search Report issued Apr. 2, 2020 in DE Application No. 10 2019 107 334.0.
Search Report issued Dec. 20, 2019 in DE Application No. 10 2019 103 464.7.
Office Action issued Jun. 3, 2024 in U.S. Appl. No. 17/429,380.
Office Action issued Apr. 20, 2023 in European Aplication No. 19714344.9-1012 with English Translation.
Office Action issued Mar. 28, 2023 in Japanese Aplication No. 2021-547138 with English Translation.
Office Action issued Feb. 15, 2024 in European Application No. 19 742 145.6-1012 with English translation.
Office Action issued Mar. 12, 2024 in JP Application No. 2021-547137 with English Translation.
Office Action (First Examination Report) issued on Feb. 17, 2023, by the Intellectual Property India in corresponding India Patent Application No. 202117038290 with English Translation.
Office Action issued May 16, 2023 in Chinese Application No. 202080021255.X with English Translation.
Office Action issued May 17, 2023 in Chinese Application No. 202080021265.3 with English Translation.
Office Action issued May 22, 2023 in Chinese Application No. 202080022277.8 with English Translation.
Office Action issued Mar. 14, 2024 in U.S. Appl. No. 17/429,562.
Office Action issued Mar. 28, 2024 in U.S. Appl. No. 17/429,527.
Office Action issued Mar. 14, 2024 in U.S. Appl. No. 17/429,578.
Notice of Allowance issued Mar. 27, 2024 in U.S. Appl. No. 17/429,608.
Office Action issued Dec. 28, 2023 in U.S. Appl. No. 17/429,593.
Office Action issued Oct. 24, 2023 in U.S. Appl. No. 17/429,615.
Office Action issued Apr. 2, 2024 in JP Application No. 2021-547135 with English Translation.
Office Action issued Mar. 12, 2024 in JP Application No. 2021-547136 with English Translation.
Notice of Allowance issued Aug. 21, 2024, in U.S. Appl. No. 17/429,593.
Notice of Allowance issued on Oct. 25, 2024, in U.S. Appl. No. 17/429,527.

* cited by examiner

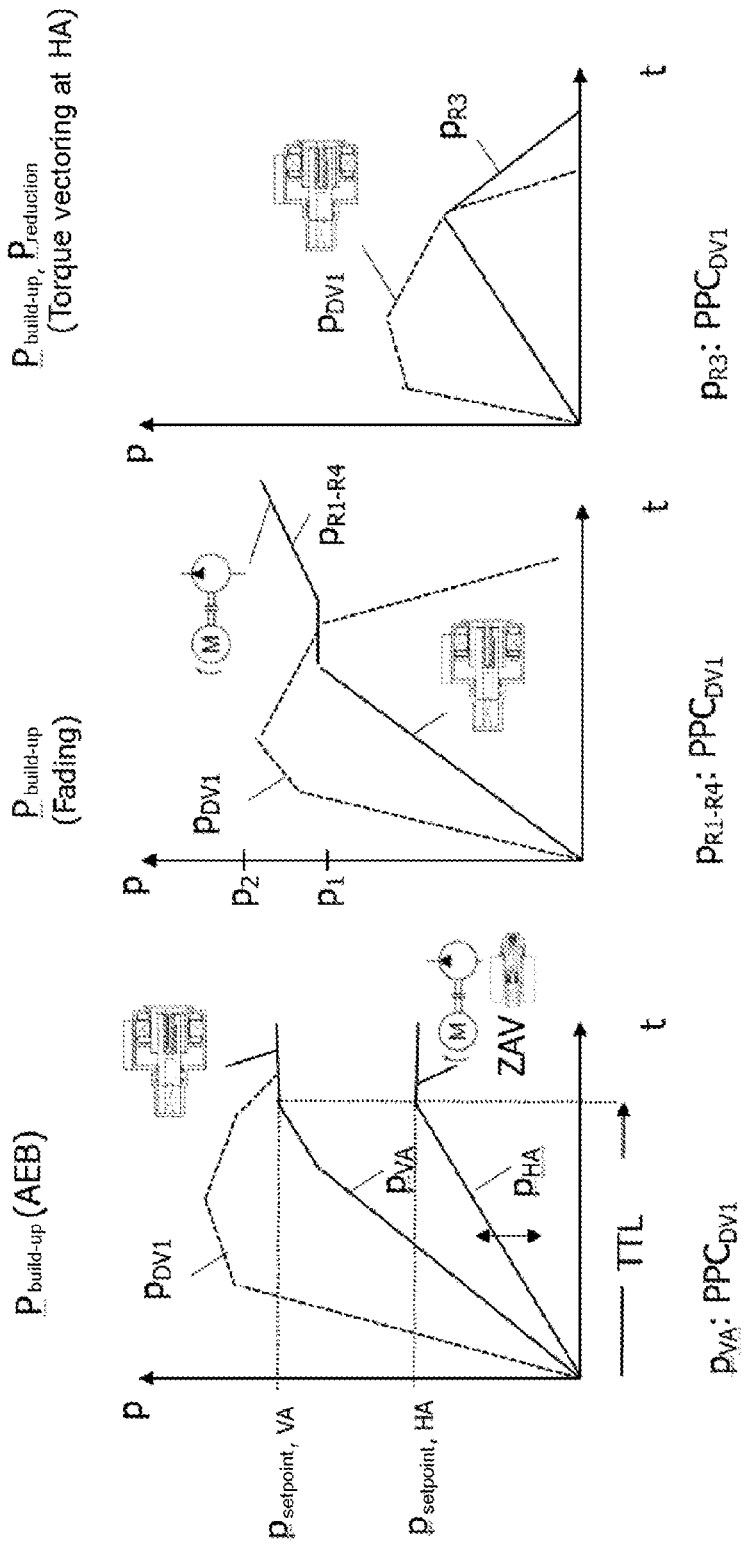

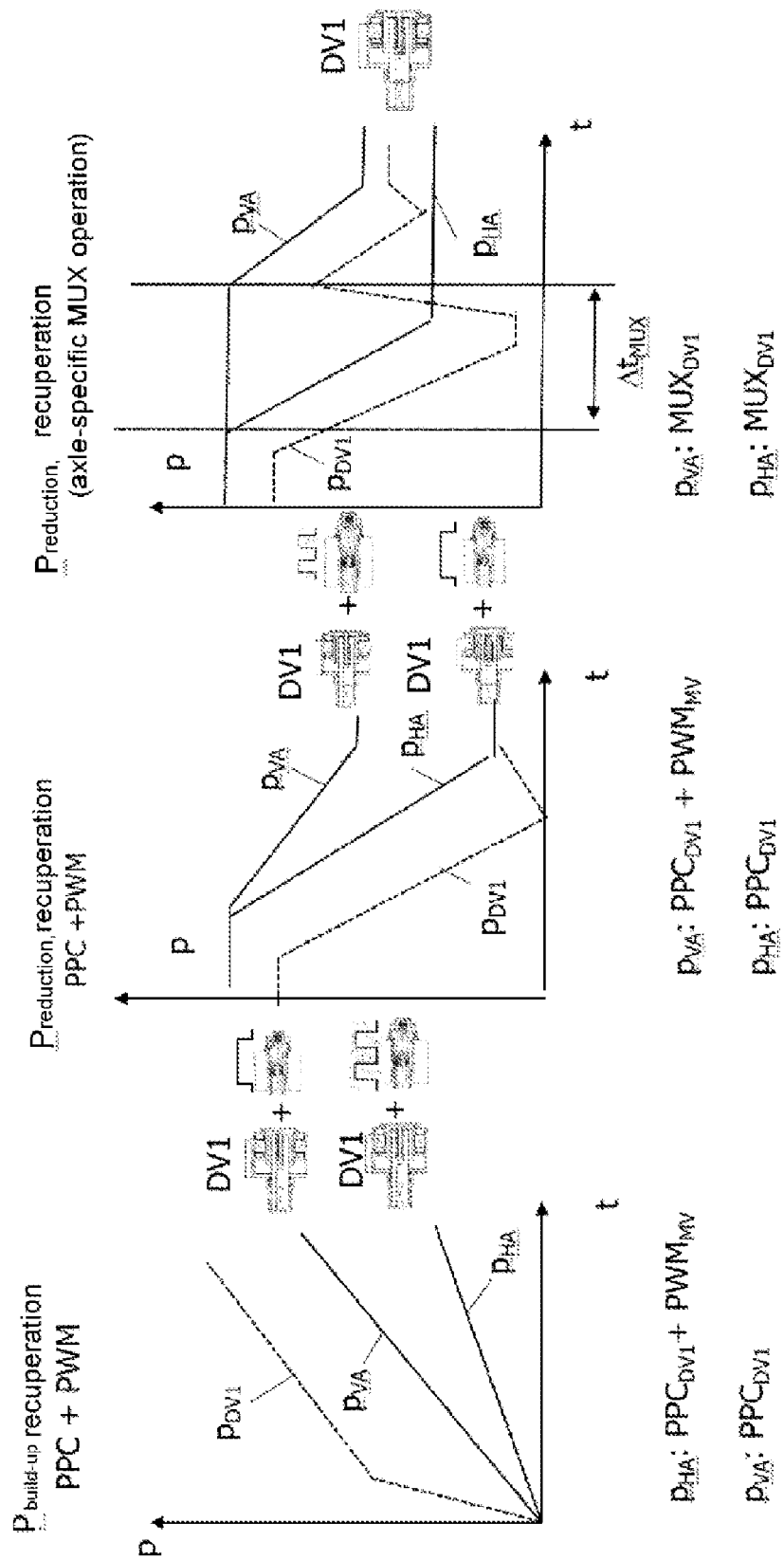

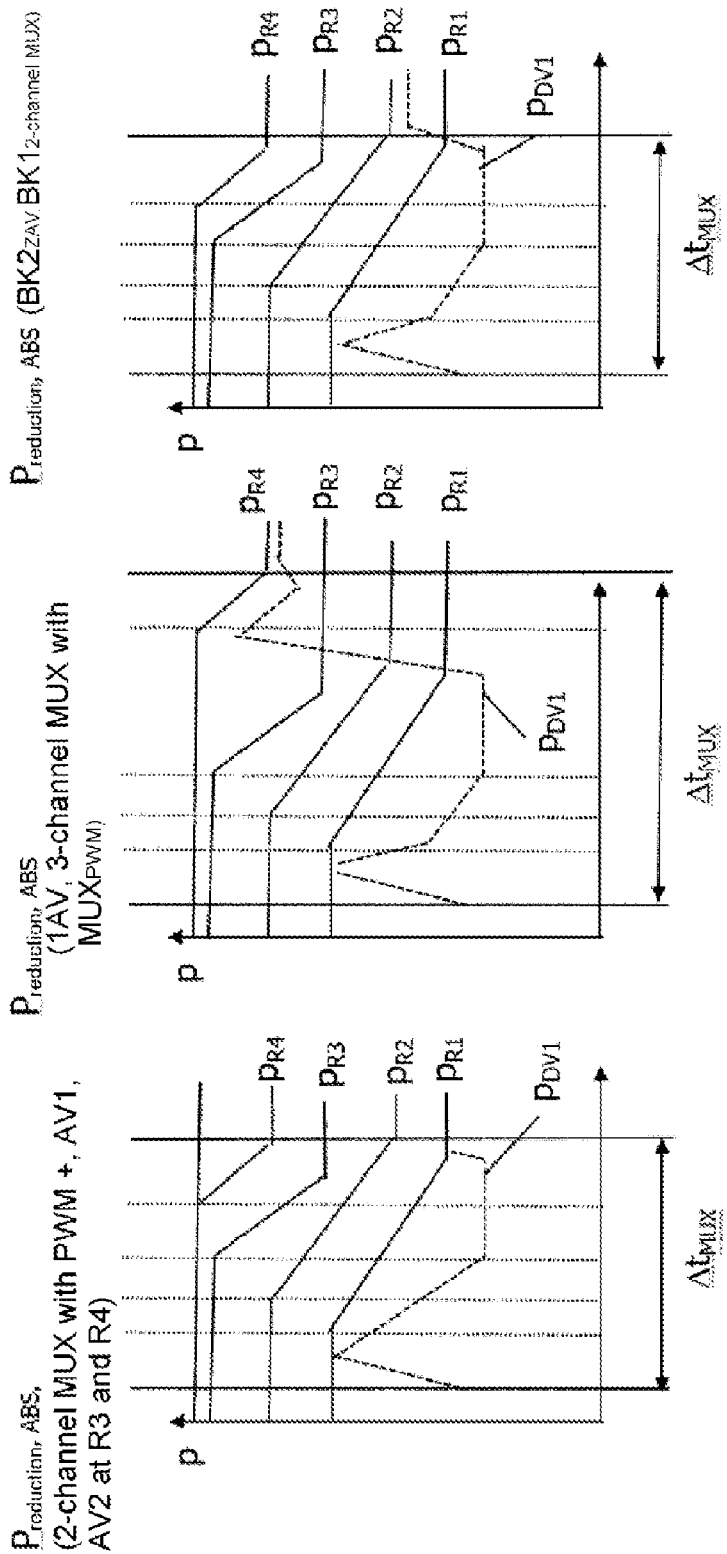

HYDRAULIC SYSTEM HAVING AT LEAST TWO HYDRAULIC CIRCUITS AND TWO PRESSURE SUPPLY DEVICES

CROSS-REFERENCE TO RELATED APPLICATION

This application is a Section 371 of International Application No. PCT/EP2019/068596, filed Jul. 10, 2019, which was published in the German language on Aug. 20, 2020 under International Publication No. WO 2020/164755 A1, which claims priority under 35 U.S.C. § 119(b) to German Patent Application No. 20 2019 101 596.9, filed Feb. 12, 2019, the disclosures of which are incorporated herein by reference.

The present invention relates to a hydraulic system and the closed-loop control method thereof, with at least two pressure supplies for redundant functions.

PRIOR ART

The automotive industry is in a disruptive process of change. In addition to the increasing market penetration of electric vehicles, various levels of automated driving (AD=Automated Drive) are being run through; in the first instance, these are: level 3—Highly Automated Driving—HAD, level 4—Fully Automated Driving—FAD and level 5—Autonomous Driving—AD, wherein the demands on the brake systems used increase at each level.

This has expedited the development of new brake systems. The replacement of vacuum brake force boosters with electrical brake force boosters (e-BKV) began in 2005 with the integrated brake system IBS1 [ATZ [Automobiltechnische Zeitschrift, German automotive industry journal] issue June 2011, DE11200900554163] with the market launch of so-called 2-box solutions with electrical slave brake force boosters and an additional ESP unit in 2013 [ATZ edition April 2018], closely followed by the first integrated 1-box systems with pedal simulator in 2017 [Bremsenhandbuch [German-language reference book on brake systems]— chapter 20]. Solutions for level 3 (HAD) are presently being developed. Future changes are described in ATZ article March 2019 "Brake force boosters for automated driving".

A redundant pressure supply first becomes mandatory from level 3 (HAD) onward. Furthermore, a connection of the brake circuits to the reservoir should be substantially avoided in the case of open brake systems, and pedal feel simulators with a constant pedal characteristic are becoming established as the standard. Furthermore, a redundancy of the ABS function must also be provided. In so-called 2-box systems with an electric brake force booster and ESP/ABS unit according to the prior art, this is implemented in such a way that the electric brake force booster (e-BKV) performs a pressure modulation function in the event of failure of the ESP unit, in order always to ensure a high level of vehicle deceleration. Here, in the first step, a so-called "ABS select-low or axle-specific closed-loop pressure control for the electronic brake force distribution (EBV)" is introduced. This is implemented, for example as presented in DE112009005541B3, by back and forth movement of the piston of a piston-cylinder unit.

From level 4 (FAD) onward, 3-fold redundancies are expected for adequate system availability, for example in the case of the pedal sensors with the rule "2 out of 3". Furthermore, a pedal simulator is essential owing to the increasing recuperation performance of electric vehicles and the lack of acceptance of changes in the pedal characteristic, because fully automatic driving (FAD) operation can be implemented over a longer period of time and the driver is not prepared for a change in the pedal characteristic in the event of switching to piloted driving. To monitor the pressure supply, a redundant pressure transducer must be provided or an alternative diagnostic facility must be provided. Furthermore, a redundant ABS function with at least axle-specific, in particular wheel-specific closed-loop wheel control is required, and partial redundancies are introduced. Brake systems with closed brake circuits in ABS operation have safety advantages over hydraulic systems in which, in closed-loop control operation, pressure is released via opened outlet valves into a reservoir.

The requirements, in particular safety requirements, for semi-automated (SAD) and fully automated (FAD) driving have, as stated in the introduction, a major influence on the system configuration. These require redundant and partially redundant systems, functions and components.

The focus here is on the redundant pressure supply, with which the brake force or the pressure build-up must be ensured even without a driver's foot.

The electronic controller must correspondingly also be configured for this function. For AD level 3, in particular AD level 4, the ABS function must likewise be ensured even in the event of a fault. Redundancy in the ABS function in either "axle-specific closed-loop control" or "wheel-specific closed-loop control", depending on the AD automation level.

With a redundant pressure supply, it is also possible to implement a system concept without tandem master cylinder HZ, only with a so-called electric pedal, or, for AD level 5, only with a central computer, which specifies a setpoint signal. The following patent applications are of note: DE 102017222450 discloses a hydraulic system with only one master cylinder, a redundant pressure supply, isolation valves to the master cylinder, and a travel simulator. A bypass valve between the two brake circuits allows a supply to both brake circuits in the event of a pressure supply failure of the second pressure supply. Closed-loop control operation with valves which are open when electrically deenergized is extremely relevant to safety, because a failure of the valve and for example of a brake circuit can result in a total brake failure.

DE 10 2017 222 435 and DE 10 2016 225 537 present a concept with 2 pressure supplies and an electric pedal, redundant pressure supply and bypass valve. All systems use an outlet valve for the ABS function during the pressure reduction, via which outlet valve pressure is discharged into the reservoir. If a dirt particle enters the valve seat when the valve is opened, this can cause a brake circuit failure during the next braking operation.

DE 10 2017 207 954 presents a system concept with redundant pressure supply and without outlet valves for the closed-loop ABS pressure control. The so-called multiplex closed-loop pressure control method introduced in DE 102005055751 and DE 10 2009 008944 is used here, in which the pressure control for ABS is performed from the pressure supply by means of volume measurement and pressure information. Here, the switching valves are also used for the pressure control. A safety risk arises if the piston seal or a check valve to the reservoir fails and the switching valve is leaking owing to dirt particles, which likewise results in a total brake failure.

WO2019002475A1 discloses a further variant with two pressure supplies, which are both designed as electrically driven piston-cylinder units, and also with an actuation content with a pedal feel simulator or a central ECU without an actuation unit for AD level 4 or AD level 5. Here, the actuation unit is mounted on the bulkhead and is separate from the pressure supply device. The functional redundancy in ABS operation is achieved in that, in the event of failure of one pressure supply device, the second pressure supply device performs the closed-loop ABS control operation at all wheel brakes via a connecting module. The 2nd module can and thus meet the functional redundancy requirements for AD level 4 and AD level 5. For closed-loop control operation, it is preferably likewise the case that the multiplex method according to DE 102005055751 or DE 10 2009 008944 is used, with the primary aim of not opening the brake circuits, or only seldom opening the brake circuits, and thus increasing the fail safety in relation to DE 10 2017 222 435, in which the pressure reduction is performed primarily by means of outlet valves. It is stated in ATZ March 2019 that operation in an open brake circuit is critical to safety. In so-called open brake systems, in the event of ABS interventions, the wheel circuit is hydraulically connected to the reservoir by opening of an outlet valve. As a result, unidentified leaks in valves, for example owing to dirt particles in the valve seat and seals (dormant faults), are particularly relevant. If, for example, a solenoid valve with a dormant fault connects the two brake circuits, the pressure supply DV and, in the worst case, also the entire brake can fail in the event of a brake circuit failure.

The above examples demonstrate the problem of dormant faults, which become critical in the case of double faults if these cannot be detected by the diagnosis before the braking maneuver.

OBJECT OF THE INVENTION

It is the object of the invention to provide a compact, inexpensive and extremely fail-safe hydraulic system with multiple brake circuits and two cost-optimized pressure supplies.

ACHIEVEMENT OF THE OBJECT

Said object and further advantages may be achieved by means of a brake system according to one or more of the accompanying claims.

ADVANTAGES OF THE INVENTION

The solution according to the invention describes system configuration and methods for the closed-loop pressure control of a redundant hydraulic system in four embodiments a brake system. The embodiments all have two pressure supplies and also two hydraulic circuits and differ in the structural form and the nature of the detection of a driver demand. The structural form is either an integrated system or a distributed system with a separate actuation unit for the detection of a driver demand. The driver demand is detected by means of a hydraulic actuation unit with a pedal feel simulator or a purely electric pedal without hydraulic fluid. In one embodiment (cf. DE102017222435A1 and DE102017222450A1), an electrically driven piston-cylinder unit is used as the first pressure supply (DV1) and a rotary pump with continuous delivery action (piston pump or gear pump) is used as the second pressure supply (DV2). In an alternative embodiment, instead of the piston-cylinder unit, an electrically driven gear pump is used as first pressure supply device. In the embodiments (piston-cylinder unit or gear pump), pressure is built up and reduced by means of the gear pump/piston-cylinder unit. Pressure can be built up simultaneously or partially simultaneously by means of the pressure supplies (DV1 and DV2). This can be utilized for downsizing the pressure supply, increasing the pressure build-up dynamics, or redundancies.

By contrast to the prior art, the brake system according to the invention furthermore operates with few solenoid valves, pressure transducers and very compact and inexpensive pressure supplies, and furthermore, both pressure supplies are integrated in one small structural unit. At the same time, the high requirements of AD levels 3 and 4 with regard to fail safety and redundancy of the functions are met. For example, even in the event of a brake circuit failure, there is very high availability in the remaining brake circuit and, in the event of failure of a pressure supply, the ABS function requirement can be met with axle-specific, brake-circuit-specific closed-loop pressure control or wheel-specific closed-loop control for AD levels 3 to 4.

Additionally, the architecture is designed such that the hydraulic system covers all vehicle classes (small cars to SUVs), because the delivery volume of the 2nd pressure supply DV2 is not limited. In the case of a higher volume requirement, DV1 can also impart a replenishing delivery action, for example by backward movement of the piston. If DV1 is designed as a gear pump, volume can be delivered continuously.

In relation to the prior art, the solution according to the invention is very inexpensive and compact and at the same time exhibits very high availability in the event of failure of components and leaks. According to the main claim, this is achieved primarily in that the first and the second pressure supply device (DV1, DV2) can build up pressure in both brake circuits (BK1, BK2) independently of one another and/or simultaneously/partially simultaneously. At the same time, this leads to high availability, because each pressure supply device can be used to perform closed-loop control operation (ABS, ESP), with at least axle-specific or brake-circuit-specific closed-loop control, independently of the functionality of the other pressure supply device.

The very inexpensive and compact design is realized in that the first pressure supply DV1 is preferably designed for a first pressure (p1) and limited volume in the forward stroke. The pressure supply DV1 generates pressure up to the wheel locking pressure, generally 80-120 bar, whereas the second pressure supply DV2 is designed for up to the maximum pressure (p2) in the brake system, which can generally rise to 180-200 bar in the presence of influential factors such as fading owing to overheated brakes in passenger motor vehicles. In the case of electric vehicles, the fading effect can be reduced by way of braking operations by means of electric motor, that is to say a low maximum pressure is required. However, this effect can be utilized only if the vehicle weight does not increase owing to batteries of the electric drive. Since the pressure supply DV2 imparts a continuous delivery action, the volume of the piston-cylinder unit of the pressure supply DV1 is preferably limited in the context of cost and installation space optimization, and does not cover, or only partially covers, the volume requirement of the brake system that is required owing to the effect of influential factors such as air bubbles, oblique wear, knock-back and friction coefficient fluctuations. If the volume requirement increases, the volume can either be provided by means of the second pressure supply DV2, or it is replenished from the reservoir by means of the pressure supply DV1 by backward movement of the piston and prior isolation of the pressure supply DV1 from the brake circuit. As a result, the piston-cylinder unit can be made very short, and the drive motor of the piston-cylinder unit can be designed for a low motor torque, which leads to a cost and weight reduction of the pressure supply. Furthermore, in the case of an embodiment of the first piston-cylinder unit with a spindle drive, the load on the spindle drive is reduced, which leads to further cost savings in the pressure supply device and to less wear in the seals. In normal operation, that is to say without any significant change owing to the abovementioned influential factors, primarily the pressure supply DV1 is used for the brake force boosting and closed-loop pressure control in recuperation operation and in closed-loop control operation (ABS, ESC function). By contrast, the pressure supply DV2 is used preferably only for emergency braking functions (AEB) for extremely rapid pressure build-up, during operation at high pressures, and in the event of failure of the first pressure supply DV1. The preferential use of the pressure supply DV1 for normal operation is based on the fact that its operation is quieter and more precise, because a pump embodied as a radial piston pump exhibits pressure amplitudes owing to the operating principle, and is therefore louder and can be controlled in closed-loop fashion via closed-loop control valves less precisely than a piston-cylinder unit or a gear pump. If a gear pump is used as the second pressure supply, there is no noise limitation.

The pressure build-up of the pressure supply DV1 is performed by forward movement of the piston of the piston-cylinder unit, and the pressure reduction is performed by backward movement of the piston of the pressure supply DV1 or via one or more outlet valves. The pressure build-up and pressure reduction in the active system in normal operation (brake force boosting, recuperation, torque vectoring) is primarily controlled in closed-loop fashion by means of the pressure supply DV1 exclusively by back and forth movement of the piston, which will also be referred to and understood in the following as PPC closed-loop pressure control. PPC closed-loop pressure control may be implemented here with and without a pressure transducer signal. If a pressure transducer is used, the closed-loop control is preferably increased in precision by the sensor signals of the drive motor of the pressure supply DV1 (motor current, angular position of the motor) and the pressure-volume characteristic curve of the brake circuits, in particular in the case of the precise closed-loop pressure profile control during blending operation, for example during recuperation of braking energy by means of electric motors at one or more axles and the resulting different pressures and pressure profiles at the axles of the vehicle. If the pressure transducer fails or is not available in the brake circuit for closed-loop control, the piston force can be calculated, and the pressure can thus be controlled in closed-loop fashion in an approximate manner, by way of the current-proportional relationship between phase current (motor torque $M_{motor}$=torque constant kt*phase current $i_{phase}$) and motor torque. Temperature influences are preferably replicated by means of a temperature sensor, which corrects the influence of the temperature on the torque constant $kt_{Temp}$=kt*(1−$f_{Temp}$*ΔK) (where $kt_{Temp}$: kt if the temperature differs from room temperature 20° C., $f_{Temp}$: correction factor temperature in %, ΔK: temperature change in Kelvin) and thus allows a very precise motor torque calculation even in the presence of different temperatures.

The pressure build-up in the pressure supply DV2 is performed by means of an electrically driven piston pump, preferably by means of a radial piston pump or a gear pump that has been tried and tested for many years in motor vehicle brake systems. A solenoid valve is required in a piston pump for the purposes of pressure limitation and pressure reduction. In relation to the prior art (DE102017222435A1), no separate valve on the pump is utilized in the solution according to the invention, but rather an outlet valve of the hydraulic system is utilized for the closed-loop pressure control. The reduction of a pressure built up by means of the pressure supply DV2 is performed via outlet valve(s) or by means of the PPC closed-loop pressure control of the pressure supply DV1. A convenient and low-noise pressure reduction via the central outlet valve ZAV without PPC closed-loop pressure control of the pressure supply DV1 is possible by PWM control of the switching valves SV of the wheel cylinders and/or PWM control of the valves BP1 and BP2. According to the invention, a gear pump is used as the pump as an alternative to the radial piston pump. This allows the pressure reduction to also be performed by means of the pump. For this, it is necessary that the drive motor of the pump can be operated at least with closed-loop rotational speed control, and that the rotational speed direction can be reversed.

During closed-loop control and recuperation operation, the wheel-specific or brake-circuit-specific closed-loop multiplex control, the so-called MUX closed-loop pressure control, is used, wherein the multiplex method is performed only with switching valves or alternatively additionally with at least one outlet valve (at the wheel brake, central valve between brake circuits). This allows the simultaneous pressure reduction in multiple wheel brakes, or one brake circuit, whilst pressure is built up in the other wheel brakes/2nd brake circuit. By means of the combination of the closed-loop MUX control, the closed-loop control of the pressure reduction via outlet valves and closed-loop MUX control, it is possible for solenoid valves to be omitted, which leads to a further reduction in costs in the device according to the invention. Thus, with a cost-optimized design, only one central outlet valve ZAV is required. To further increase safety, a series-connected second outlet valve ZAVr (from FIG. 1) can be used. The central outlet valve ZAV connects the wheel brakes to the reservoir. As stated above, this connection is safety-critical with regard to dormant faults. Alternatively or in addition, outlet valves (AV1, AV2) at the wheel brake may be used for the pressure reduction by dissipation into the reservoir. These outlet valves are preferably provided in each brake circuit or at the wheel brakes of the front axle. In the case of black/white brake circuit distribution, the outlet valves AV1, AV2 are on the front-wheel brake cylinders of one brake circuit, and in the case of diagonal brake circuits, said outlet valves are on the front-wheel brake cylinders in two brake circuits, wherein the outlet valves are connected to the reservoir and can be isolated from the brake circuit by means of switching valves. The positioning of the outlet valves at the front axle is based on the fact that the volume of the front-wheel brakes is greater, and therefore outlet valves can advantageously be used most sensibly there to relieve the load on the pressure reduction dynamics.

Furthermore, the pressure build-up and pressure reduction in PPC or MUX operation can be further refined in terms of closed-loop control by PWM control of the solenoid valves between wheel brake and pressure supply (PPC+PWM, MUX+PWM), such that, in the case of PPC closed-loop pressure control, different pressure profiles can be realized simultaneously at different wheel brakes.

Aside from the possibility of reducing the pressure via outlet valves, it is also possible for the pressure of two wheel brakes to be reduced simultaneously in a simultaneous pressure reduction method by backward movement of the piston of the pressure supply DV1, wherein one switching valve is fully opened and PWM clocking of the second switching valve is performed, or a valve opening cross section can be set by way of operation with closed-loop current control. A simultaneous or partially simultaneous pressure reduction by piston control of the pressure supply and/or multiplex operation is thus possible even in the case of different pressure levels in the wheel brakes, and different pressure gradients can be controlled in closed-loop fashion at the same time. The PWM method can likewise be used for pressure build-up using the PPC or MUX method. This means that the brake circuit can be operated in an entirely or substantially closed manner, which, as stated in the ATZ March 2019 article, significantly increases fail safety.

Through the combination of the different closed-loop pressure control methods in the hydraulic system according to the invention, the closed-loop pressure control cycle of 4 wheel brakes can be significantly shortened in relation to the pure MUX method, which has a highly advantageous effect on the dynamics of the closed-loop wheel pressure control and does not require a special electric motor with low inertial mass for the pressure supply DV1 for the MUX operation, and does not require switching valves to the wheel brakes with very low flow resistance, and at the same time the number of solenoid valves in the hydraulic system can be significantly reduced. Whereas two pressure transducers and 16 solenoid valves are required in DE102017222450, the system according to the invention can, in a simplest embodiment, be operated with only 8-9 solenoid valves and 1 pressure transducer with similar or even higher availability and fail safety.

In the simplest embodiment, the brake system has two pressure supplies and only 8 solenoid valves (electric pedal) or 9 solenoid valves (hydraulic simulator), which can be expanded to up to 12 solenoid valves if not all degrees of freedom in the closed-loop pressure control are utilized. Additionally, it is preferable for only one pressure transducer to be used, which is positioned in a brake circuit BK2 which is used for the pressure build-up by means of the pump. Alternatively, a further pressure transducer is provided in the brake circuit BK1. Solenoid valves at the wheel brakes are preferably designed as switching valves SV which are open when electrically deenergized and which have low flow resistances, and which can preferably additionally be operated using PWM operation. Solenoid valves (BP1, BP2, switching valves on wheel brakes) which are open when electrically deenergized are preferably PWM-controlled, and the valves also have different flow resistances (ZAV, $ZAV_r$, SV, BP1 with large opening cross section, outlet valves AV1, AV2 on wheel brakes with small opening cross section).

Switching valves are hydraulically connected via the valve seat to the wheel brake and are automatically opened by way of the pressure in the wheel brake. The independent opening is an important safety feature, in particular in the implementation of multiplex operation for wheel brakes where no outlet valve is provided at the wheel brake, in order that the pressure in the wheel brake can be reduced even in the event of a fault of valves. The pressure supply is connected to the armature part. With such a connection, the pressure difference at the valve during the pressure build-up is relatively low, but, in configuring the spring of the solenoid valve RF, it must be observed that the pressure difference does not lead to the valve being forced closed during the pressure build-up when the volume from the pressure supply DV is delivered into the wheel brake. Such an advantageous connection allows valves with a large opening cross section ÖQ or low flow losses, ideal for the PPC and MUX closed-loop pressure control method.

Additionally, the connecting valves BP1 and BP2 are connected such that they are self-opening by way of the pressure in the brake circuit, and can furthermore be operated using PWM operation. This allows closed-loop pressure control of the pump and a pressure reduction via the central valve ZAV.

In detail, the following closed-loop pressure control methods are used in the device according to the invention, and lead to a very high level of precision and availability even in the event of failure of components (pressure supply, sensors, brake circuit failure) and thus to a very robust and fail-safe solution.

(1) Pressure build-up in normal operation without significant influential factors:
   a) Pressure build-up using the PPC method up to pressure p1, maximum wheel locking pressure+/−20% (generally 80-120 bar) by way of piston control of the pressure supply DV1 in the forward movement of the piston (forward movement=compression of the fluid volume in the direction of hydraulic consumers at the wheel brake), with use of at least one pressure transducer
   b) Pressure build-up using the PPC method up to pressure p1, maximum wheel locking pressure+/−20% (generally 80-120 bar) in the forward movement of the piston of the pressure supply DV1, with use of the signals of motor current, piston travel and pressure-volume characteristic curve, without use of the pressure transducer
   c) Pressure build-up using the MUX method up to target pressures, that is to say setting a first wheel pressure at at least one wheel brake, closing the switching valves, followed by increasing the pressure at further wheel brakes
   d) Pressure build-up up to different target pressures by way of piston control with one of the methods (1a)-(1c) and use of PWM clocking of the solenoid valves which are open when electrically deenergized, for the purposes of closed-loop control of different pressure profiles or compensation of different flow resistances in the wheel brakes
   e) Combination of closed-loop pressure control methods (1c) and (1d)
   f) Pressure build-up up to a first pressure close to the wheel locking limit by means of pressure supply DV1, further pressure increase by means of pressure supply DV2 up to the maximum pressure upon closure of the feed line valve of the pressure supply DV1 to the brake circuits (2) Pressure reduction in normal operation without significant influential factors:
   a) Pressure reduction using the PPC method to the target pressure by way of piston control of the pressure supply DV1 in the backward movement of the piston (backward movement=decompression of the fluid volume of hydraulic consumers at the wheel brake), with use of at least one pressure transducer
   b) Pressure reduction using the PPC method to the target pressure by backward movement of the piston of the pressure supply DV1, with use of the signals of motor current, piston travel and pressure-volume characteristic curve
   c) Pressure reduction using the MUX method to target pressures at wheels, that is to say setting a first wheel pressure at at least one wheel brake, closing the switching valves, increasing the pressure at further wheel brakes d) Pressure reduction via at least one outlet valve, wherein, by means of closed-loop current control in the outlet valve, a particular discrete, substantially constant opening cross section of the solenoid valve is set, which determines the pressure change e) Pressure reduction to different target pressures by way of piston control with one of the methods (1a) to (1c) and use of PWM control of solenoid valves which are open when electrically deenergized, for the purposes of realizing different pressure profiles and compensation of different flow resistances in the wheel brakes f) Pressure reduction in wheel brakes or brake circuits via outlet valves at the wheel brakes or pressure reduction in one or both brake circuits via a central outlet valve ZAV, in particular in the case of high pressures that lie above the pressure limit of the pressure supply DV1 g) Combination of at least one of the closed-loop pressure control methods (1a) to (1f)

(3) Pressure build-up in emergency braking operation (AEB function) with extremely fast closed-loop control operation a) Pressure build-up using the PPC method up to pressure p1, maximum locking pressure (generally 80-120 bar) by way of piston control of the pressure supply DV1 in the forward movement of the piston with maximum motor power b) Method using the PPC method according to 3(a) with compensation of the different pressure changes in the wheel brakes owing to different flow resistances between pressure supply DV1 and wheel brakes by PWM control of solenoid valves, which are open when electrically deenergized, between pressure supply and wheel brake c) Method according to 3(a) with compensation of the different pressure changes in the wheel brakes owing to different flow resistances between pressure supply DV1 and wheel brakes by way of partial pressure reduction via at least one outlet valve (AV1, AV2, ZAV)

d) Method according to 3(a), supplemented by the MUX method for compensation of the different pressure changes in the wheel brakes owing to different flow resistances between pressure supply DV1 and wheel brakes e) Method according to 3(a) with compensation of the different pressure changes in the wheel brakes owing to different flow resistances between pressure supply DV1 and wheel brakes by way of partial use of the pressure supply DV2 for the pressure build-up in one brake circuit f) Simultaneous or partially simultaneous pressure build-up by means of pressure supply DV1 in a first brake circuit BK1 and pressure build-up by means of pressure supply DV2 in the second brake circuit BK2 g) Pressure build-up by means of pressure supplies DV2 and DV1 simultaneously or partially simultaneously in both brake circuits using the MUX method (4) Simultaneous pressure build-up and pressure reduction in normal operation a) Pressure build-up up to the target pressure in the forward movement of the piston of the pressure supply DV1 in one brake circuit, pressure reduction in the second brake circuit via outlet valves on the wheel brakes (AV1, AV2) or central outlet valve (ZAV)

b) Pressure build-up up to the target pressure in the forward movement of the piston of the pressure supply DV1 in both brake circuits, pressure reduction in a wheel brake via one or more solenoid valve(s) at the wheel brakes with the switching valve of that wheel brake closed, wherein the pressure reduction is performed via outlet valves c) Pressure build-up up to the target pressure in the forward movement of the piston of the pressure supply DV1 in multiple wheel brakes using multiplex operation with simultaneous pressure reduction via outlet valves AV1, AV2 at the wheel brakes with switching valve closed d) Pressure build-up up to the target pressure in the forward movement of the piston of the pressure supply DV1 in multiple wheel brakes using multiplex operation with simultaneous pressure reduction via outlet valves AV1, AV2 at the wheel brakes with switching valve closed e) Pressure build-up up to the target pressure in the forward movement of the piston of the pressure supply DV1 in multiple wheel brakes using multiplex operation with simultaneous pressure reduction in one brake circuit a central outlet valve ZAV.

(5) Pressure build-up and pressure reduction in the event of a fault of pressure supply DV1 a) Pressure build-up by means of pressure supply DV2 over the entire pressure range, pressure reduction by dissipation via into one or more brake circuit(s) via central outlet valve ZAV b) Pressure build-up by means of pressure supply DV2 over the entire pressure range, pressure reduction in one or more wheel brakes of a brake circuit via outlet valve AV at the wheel brake c) Pressure build-up with closed-loop pressure profile control by means of pressure supply DV with simultaneous opening of one or more outlet valves (AV1, AV2, ZAV)

d) Closed-loop pressure control method according to (5a) to (5c) and use of PWM control with solenoid valves, which are open when electrically deenergized, for the purposes of controlling the flow resistances during pressure build-up and pressure reduction e) Closed-loop pressure control method according to (5a) or (5c) and use of the pressure sensor in the closed-loop pressure reduction control via outlet valves (6) Pressure build-up and pressure reduction in the event of a fault of pressure supply DV2

(a) Operation of the motor of the pressure supply DV1 with 1×3 phases at 50% of the maximum motor torque, generally allows a deceleration of 0.4-0.6 g (b) Replenishing delivery of volume from the reservoir by pressure supply DV1 in the presence of influential factors such as air bubbles, etc.

(7) Failure of pressure transducer, unavailability of pressure transducer in one brake circuit (a) Brake pressure setting by evaluation of motor current and closed-loop control in accordance with a booster characteristic curve and current-proportional relationship between motor phase current and motor torque (torque constant) and, in particular, mechanical efficiency in the gear ratio (b) Brake pressure setting by evaluation of the pressure-volume characteristic curve, piston travel directly or indirectly by way of motor angle encoder (c) Evaluation of temperature for the purposes of compensation/correction of the torque constant (d) Combination of methods (7a) to (7c)

The above-described closed-loop pressure control methods are used in the following functions of the brake system, as follows:

(a) Closed-Loop Brake Pressure Control (Normal Function, AEB Function)

During the brake force boosting, the pressure of the piston-cylinder unit of the pressure supply DV1 is controlled by PPC pressure control by back and forth movement of the piston. If very high pressure build-up dynamics are demanded (for example emergency braking situation AEB), the pressure supply DV2 is advantageously activated in order to assist the pressure supply DV1 for the pressure build-up in a brake circuit. The power demand on the motor of the pressure supply DV1 can thus be reduced. The pressure reduction is then performed by backward movement of the piston and/or via outlet valves which, for reasons relating to noise, are preferably used only at low pressure levels, and the additional volume delivered of the pump DV2 into the system is released back into the reservoir.

(b) Pressure Control During Recuperation of Braking Energy, in Particular by Means of an Electric Motor (Recuperation Operation/Blending)

The blending (recuperation of braking energy by means of the electric drive motors of the vehicle or electric motors in hybrid systems, which can be utilized to generate braking torque) is preferably replicated by means of the piston-cylinder unit DV1. In the in wheel brakes, where an electric motor is generated braking energy, a low pressure is set. The MUX method from DE 102005055751 or DE 102009008944 is used here, that is to say the pressure build-up and reduction is controlled by means of the piston pressure in the pressure supply DV1 by back and forth movement and by way of opened switching valves, wherein pressures in the wheel brakes are held by closed switching valves. Alternatively, pressure build-up and pressure reduction may also be performed using the PPC method, wherein the wheel brakes, which require a low pressure owing to the recuperation, are operated using PWM operation during the pressure build-up, and the PWM method can be used analogously for the pressure profile control during the pressure reduction. These methods can be used for electric motors at at least one axle. In the case of black/white brake circuits, the different closed-loop brake pressure control is performed in an axle-specific manner by way of multiplexing or PPC methods with PWM control; multiplexing is used in the case of diagonal brake circuits.

(c) Pressure Control in the Case of Torque Vectoring, Steering Interventions

Torque vectoring or steering interventions are playing an increasing role in modern vehicles in order to improve agility, in particular during cornering or as a backup steering function. The brake system can be used for steering intervention at the front axle or rear axle. At the front axle, a redundancy in relation to the electric power steering system can be generated, and a redundant design of the electric power steering system can be omitted. At the rear axle, a rear-axle steering system can be omitted, and the agility of a vehicle during cornering can be increased.

If, in modern electric vehicles, electric motors are provided at each wheel of an axle, the interaction with the brake plays a major role in the closed-loop control of the wheel torque. An intervention can thus be performed both by means of the electric motor at the wheel and the brake, and precise closed-loop pressure control is of high importance in acceleration, cornering and deceleration.

Torque vectoring or steering interventions are performed primarily by means of the pressure supply device DV1. Here, the admission pressure is controlled by the piston-cylinder unit and the pressures at the wheel brakes at one axle are either controlled in closed-loop fashion in succession using the multiplex method, or different pressure profiles are controlled in closed-loop fashion at different wheels using the PPC method with PWM control at a wheel brake. Owing to the redundant design with 2 pressure supplies, intervention at the front axle and rear axle can additionally be performed simultaneously or partially simultaneously, if the brake circuits of the system have a black/white brake circuit distribution.

(d) Closed-Loop Control Operation (ABS, ESP)

The MUX method is likewise used in closed-loop control operation (ABS, ESP), wherein, in extreme situations with very steep pressure gradients (for example braking on high friction coefficient—high μ), the pressure reduction also is performed via outlet valves or by means of PWM control of the valves BP1 and BP2. In this way, the torque demand of the drive motor of the pressure supply DV1 can be reduced, or there are lower demands on the inertial mass of the rotor of the drive motor of the pressure supply DV1. The multiplex method can be advantageously assisted in simultaneous and partially simultaneous operation by means of PWM control, by virtue of the admission pressure being set by means of the pressure supply DV1. Furthermore, the expanded degree of freedom of the simultaneous closed-loop pressure control with 2 pressure supplies can be utilized, wherein the pressure is built up in one brake circuit or certain wheels and is reduced in the other brake circuit or other wheel brake cylinders.

(e) Closed-Loop Control Operation in the Event of Failure of a Pressure Supply

If the pressure supply DV1 fails, the closed-loop pressure build-up control is performed by means of the pressure supply DV2. The pressure reduction in the embodiment of the second pressure supply as a piston pump is then performed exclusively via outlet valves or the central valve ZAV. In the embodiment of the 2nd pressure supply DV as a gear pump, the pressure reduction can be performed by means of the gear pump. For the closed-loop pressure build-up control of a piston pump, outlet valves are likewise utilized for the closed-loop control, for example by partial opening in PWM operation during the pressure build-up by means of the pressure supply DV2. If pressure supply DV2 is a gear pump, the closed-loop pressure control is performed by means of closed-loop current and angular position control of the motor of the gear pump. Here, leakages in the gear pump are taken into consideration and compensated for by adjustment.

If the pressure supply DV2 fails, closed-loop control is performed exclusively by means of the primary pressure supply DV1 in accordance with the closed-loop pressure control methods described above. There are no functional limitations here. Even the limited volume of the piston-cylinder unit is not a limitation. For this purpose, replenishing delivery from the reservoir can be performed. This is performed by virtue of the pressure supply being isolated from the brake circuit by closing the connecting valve. The piston is then moved back, and volume is drawn out of the reservoir via a check valve. The time interruption is approx. 100 ms, which is not critical in the upper pressure range because the vehicle is already being decelerated. In the highly unlikely event of fading with simultaneous failure of the pressure supply DV1, the deceleration is limited by the maximum torque of the electric motor, and must be configured in accordance with the legal boundary conditions and failure probabilities. For this extremely rare case, in the case of electric vehicles or hybrid vehicles, an electric drive motor may contribute to the deceleration, or an electric parking brake is activated.

If the pressure supply DV2 is a gear pump, continuous delivery is possible, and replenishing delivery as described above is not necessary. The closed-loop pressure control of the gear pump is performed by way of closed-loop current and angular position control of the drive motor of the gear pump. Here, leakages in the gear pump are taken into consideration and compensated for by adjustment. Leakages can be determined for example through evaluation of pressure sensors in brake circuits.

Aside from the general closed-loop pressure control and the configuration of the two pressure supplies for different operating states, the hydraulic configuration of the system is of very high importance in order to achieve a very high level of fail safety. This will be discussed below in multiple embodiments:

Various possible embodiments of the invention will be discussed in more detail below with reference to drawings.

Figure 1A:
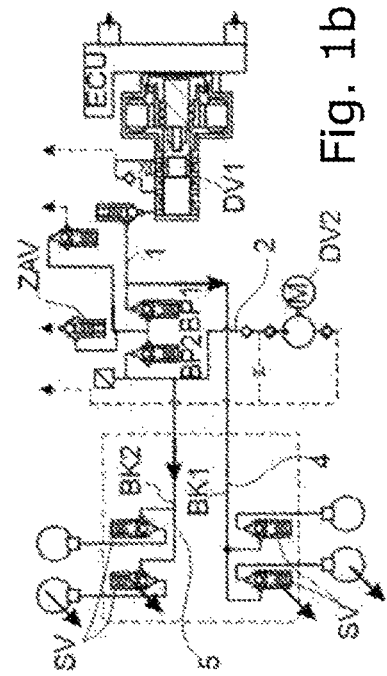
Figure 1B:
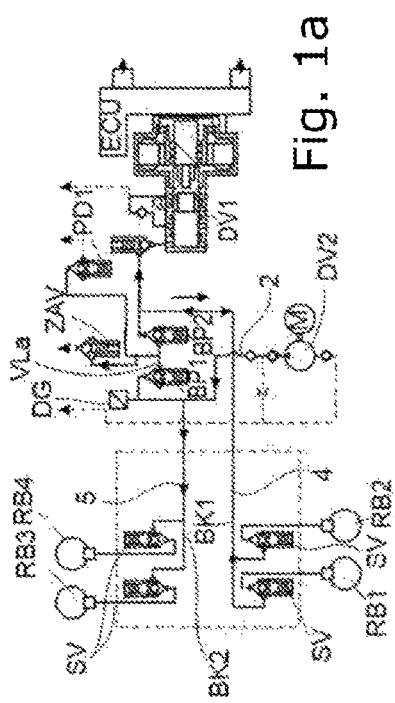
Figure 1C:
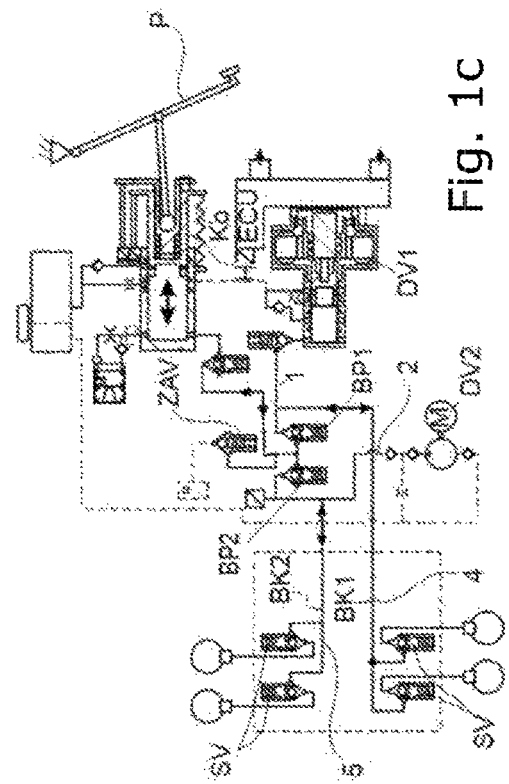
Figure 2:
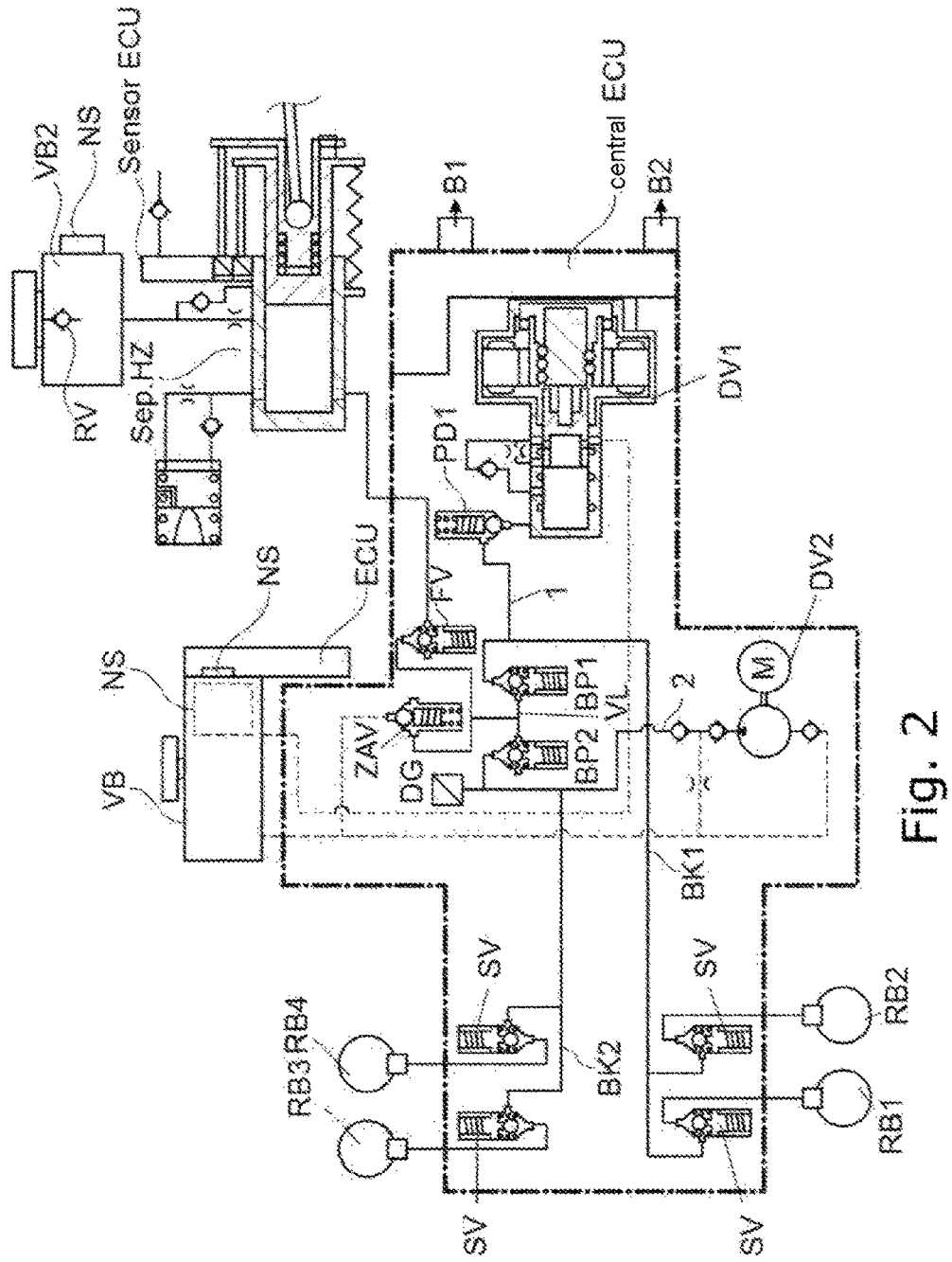
Figure 3A:
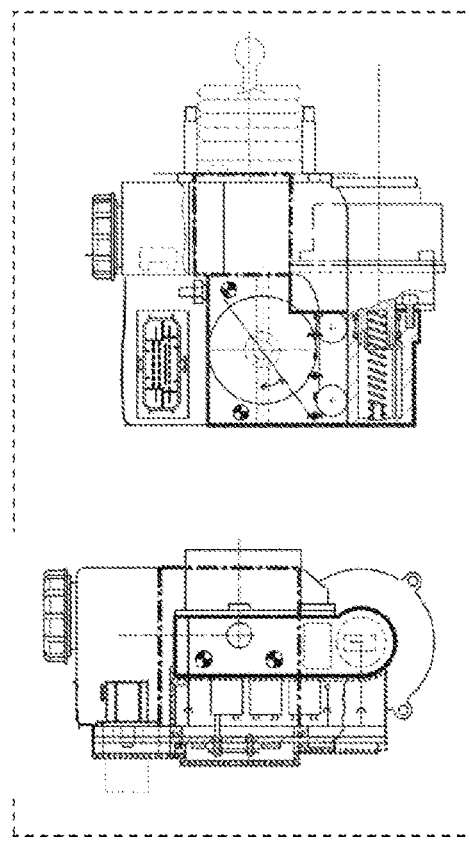
Figure 3B:
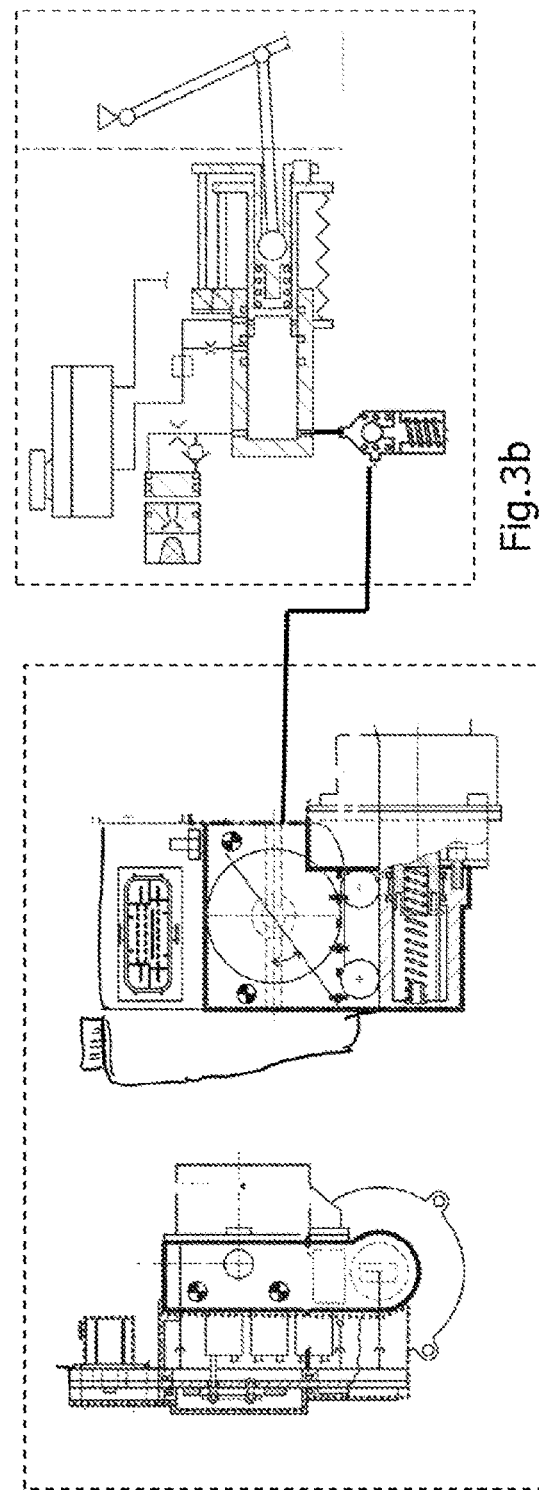
Figure 4:
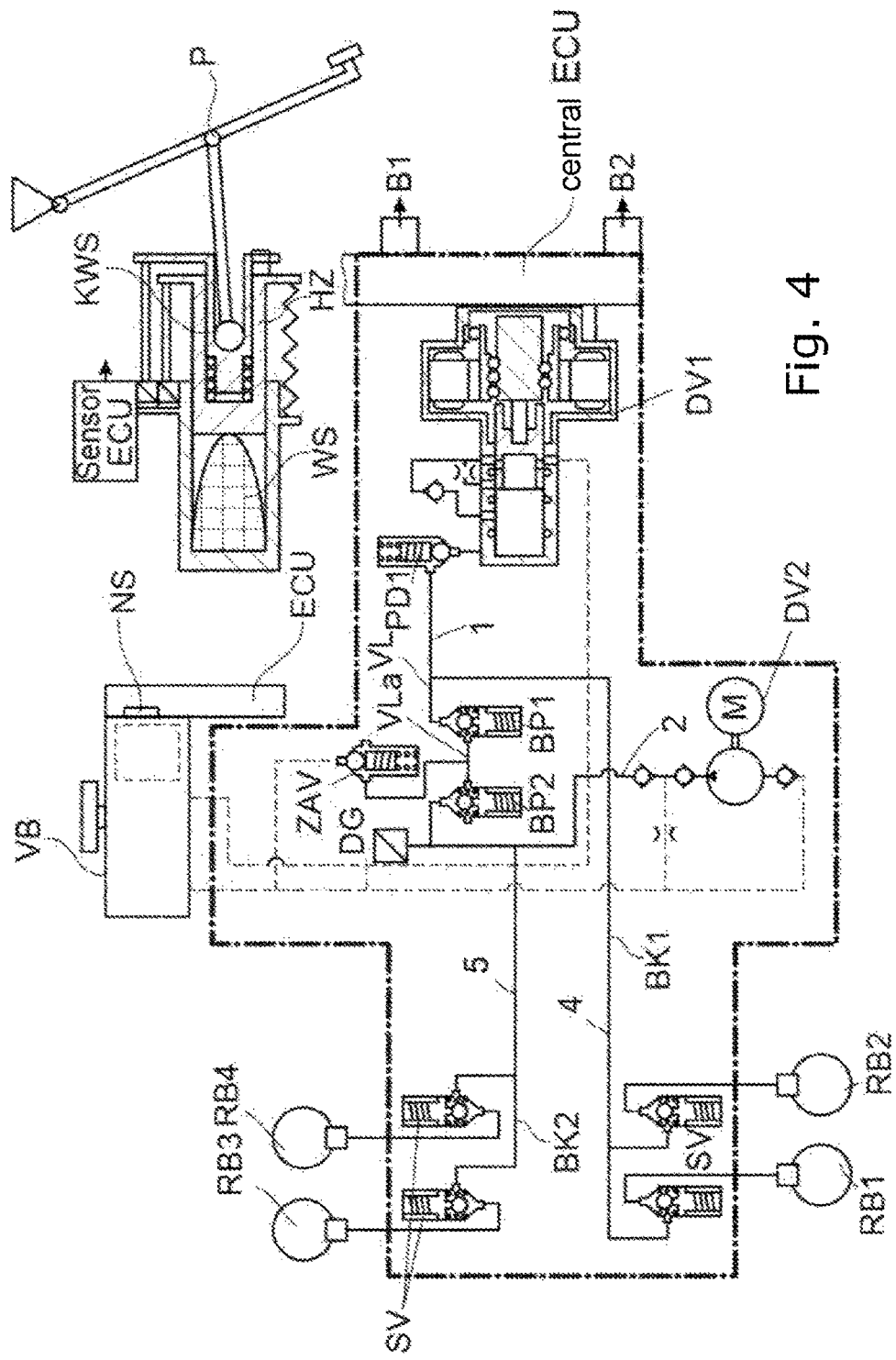
Figure 4A:
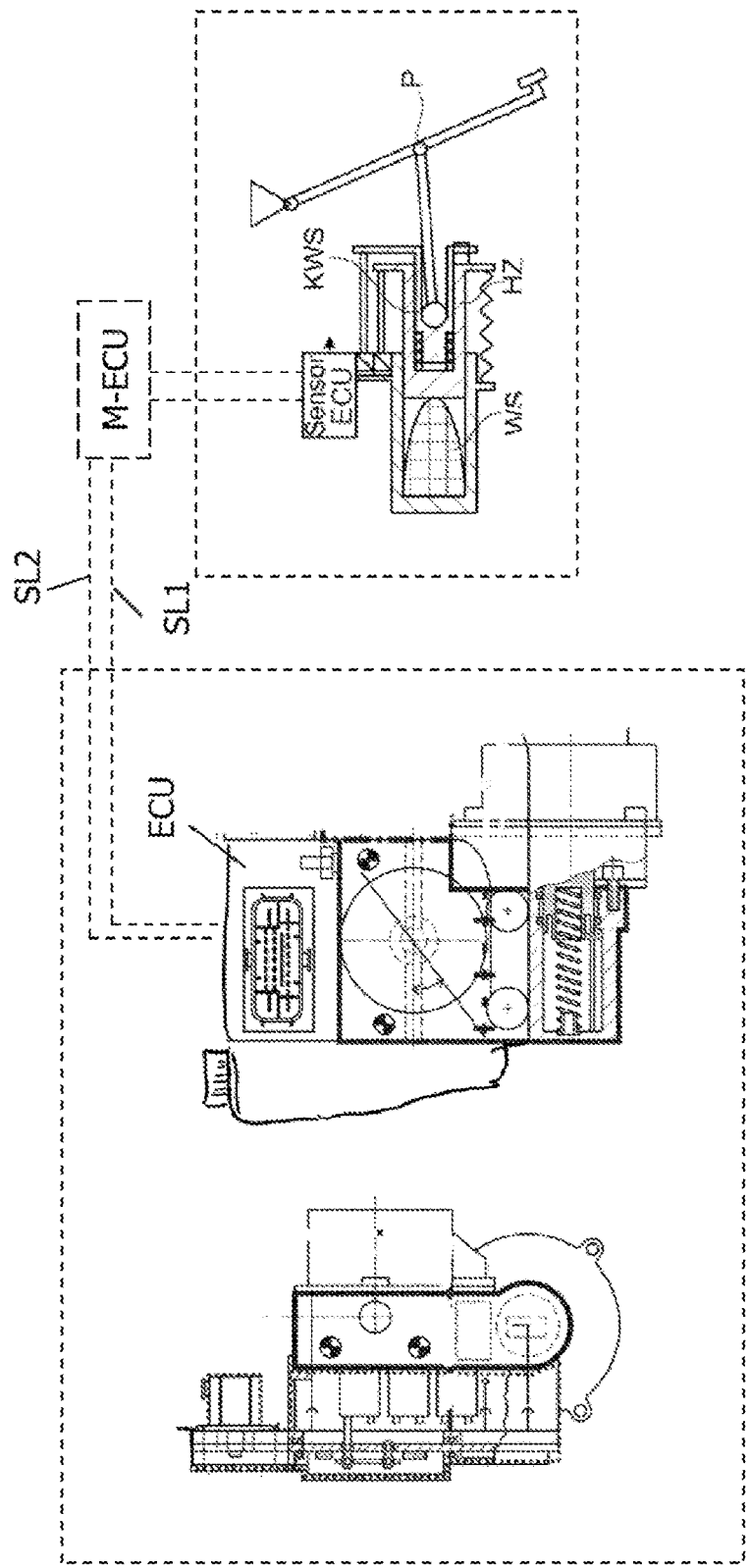
Figure 5:
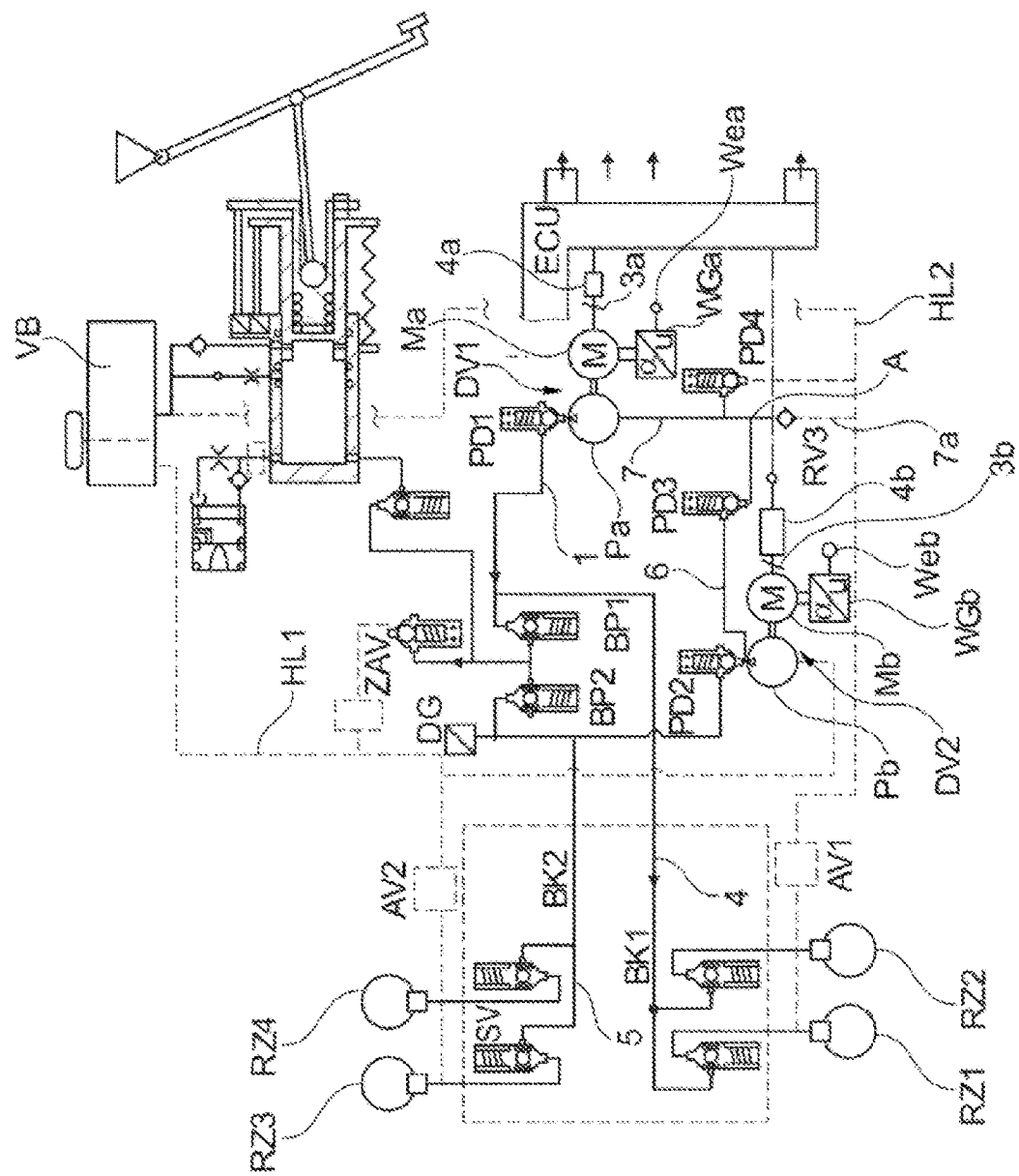
Figure 5A:
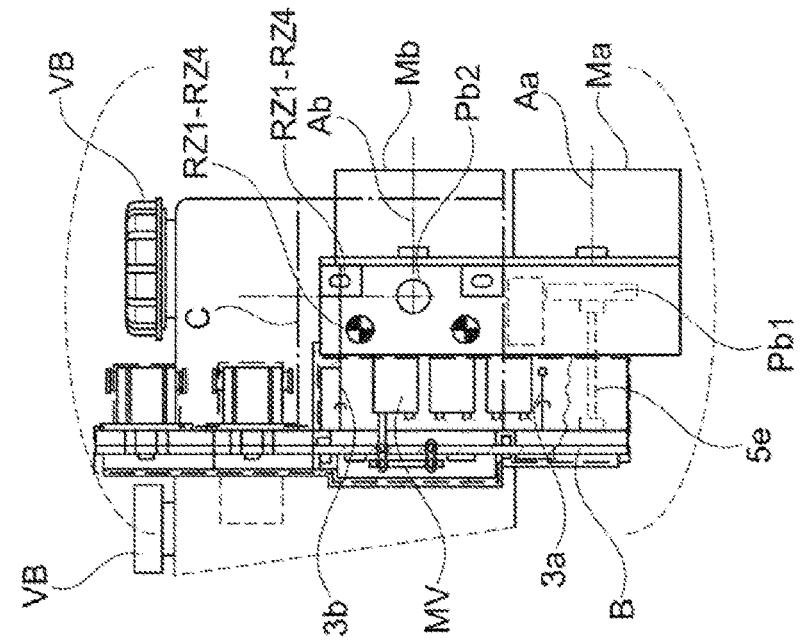
Figure 5A:
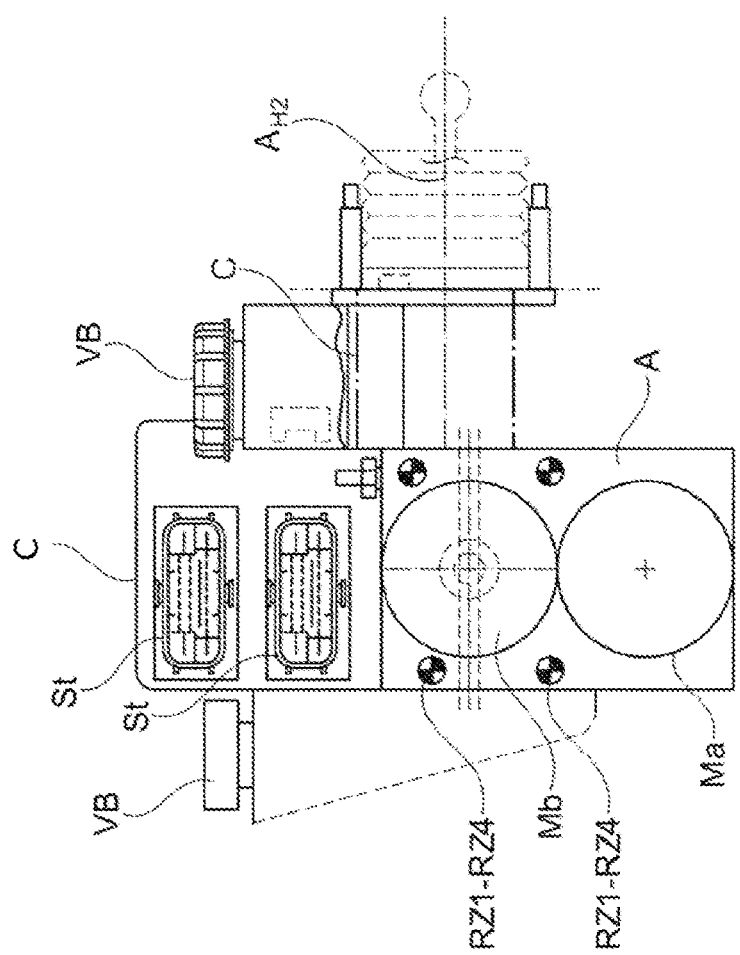

In the drawings:

FIG. 1: shows a first embodiment of a hydraulic system according to the invention with a fail-safe valve arrangement for connecting the two brake circuits, with a master cylinder with an actuating device, and with two pressure supply devices with an electronic open-loop and closed-loop control device, as a so-called integrated 1-box system;

FIG. 1a: shows the function of the brake system with both pressure supply devices;

FIG. 1b: shows the function in the event of failure in one brake circuit and/or of the switching valve of one wheel brake;

FIG. 1c: shows the function of the hydraulic system in the event of failure of both pressure supply devices;

FIG. 2: shows a second embodiment of the hydraulic system according to the invention with a master cylinder as a separate module;

FIG. 3a: shows a structural design of the first embodiment;

FIG. 3b: shows a structural design of the second embodiment;

FIG. 4: shows a third embodiment of the hydraulic system according to the invention with separate electric pedal;

FIG. 4a: shows a structural design of the third embodiment with electric pedal;

FIG. 5: shows a fourth embodiment of the hydraulic system according to the invention with 2 rotary pumps;

FIG. 5a: shows a structural design of the fourth embodiment;

FIG. 6a: shows closed-loop pressure build-up control with both pressure supplies in an emergency braking function (AEB) using simultaneous operation;

FIG. 6b: shows closed-loop pressure build-up control with both pressure supplies during operation up to at high pressures;

FIG. 6c: shows closed-loop pressure build-up control in the case of torque vectoring, steering interventions at at least one axle;

FIG. 6d: shows closed-loop pressure build-up control in the case of recuperation operation at 2 axles with pressure supply DV1;

FIG. 6e: shows closed-loop pressure reduction control in recuperation operation at 2 axles with pressure supply DV1;

FIG. 6f: shows a variant for the closed-loop pressure reduction control in recuperation operation at 2 axles with pressure supply DV1;

FIG. 6g: shows closed-loop pressure control in closed-loop control operation (ABS) with simultaneous multiplex control at 2 wheel brakes and pressure reduction via 2 outlet valves at further wheel brakes (2-channel MUX operation with PWM);

FIG. 6h: shows closed-loop pressure control in closed-loop control operation (ABS) with simultaneous multiplex control at 2 wheel brakes and pressure reduction via 1 outlet valves of one wheel brakes (3-channel MUX operation with PWM);

FIG. 6i: shows closed-loop pressure control in closed-loop control operation (ABS) with simultaneous multiplex control at 2 wheel brakes and pressure reduction via 1 central outlet valve (2-channel MUX operation with PWM, pressure reduction of one or more wheel brakes, 1 brake circuit via central outlet valve ZAV).

FIG. 1 shows the basic elements of a closed-loop-controllable brake system composed of master brake cylinder HZ with travel simulator WS and reservoir VB, and two pressure supply devices DV1 and DV2, wherein the pressure supply device DV1 has an electromotively driven piston-cylinder unit and the second pressure supply device DV2 has a simple 1-circuit piston or gear pump. Both act together with a valve circuit at the wheel brake cylinders RZ, which transmit the closed-loop-controlled wheel pressure, for example in the case of ABS, to the brake. This corresponds to the prior art. It is however the intention for the hydraulic system according to the invention to have a high level of fail safety for semi-automatic (SAD) or fully automatic driving (FAD).

For this purpose, all failure-relevant components should be taken into consideration, such as valves, sensors, seals, motors and brake circuits. The following components or hydraulic connections should therefore advantageously be designed to be fail-safe:

(1) connection from the pressure supply device DV1 provided for the first brake circuit to the second brake circuit BK2;

(2) connection from the pressure supply device DV2 provided for the first brake circuit to the first brake circuit BK1;

(3) connection from the pressure chamber of the master brake cylinder HZ via the valve FV to the brake circuits BK1, BK2 via the valves BP1 and BP2;

(4) connection of valve PD1 and valve BP1 to the wheel brake cylinders RZ via the respective switching valves SV assigned to the wheel brakes;

(5) connection of valve BD2 to the wheel brake cylinders RZ via the respective switching valves SV assigned to the wheel brakes;

(6) connection from a brake circuit BK1, BK2 to the reservoir VB;

(7) connections between brake circuits BK1, BK2 to the wheel brake cylinders RZ.

These hydraulic connections, with possible failure-inducing faults of the individual components, will be described below.

The pressure supply device DV1 acts from the brake circuit BK1 into the brake circuit BK2 via the hydraulic lines 1, VL, VLa and 5 and via the switching valves SV to the wheel brakes RB. In the prior art, only a single bypass valve is used for this purpose. Here, a valve failure can cause a total brake failure if there is also a dormant fault in a further valve. The invention therefore provides two redundant valves BP1 and BP2 in the connecting line VL in order to allow the connection to the brake circuit BK2 from the first pressure supply device DV1. Dormant faults of the valves BP1 and BP2 are identified by the pressure transducer by virtue of the valves being short-circuited in the event of a change in pressure. In this phase, the pressure must remain constant. In the event of failure of the first pressure supply device DV1, for example in the event of failure of a piston seal, the imparting of a reaction to the brake circuit BK2 via the three redundant valves BP1, BP2 and PD1 is prevented. The valves are preferably valves which are open when electrically deenergized, in order that, in the event of failure of the pressure supply devices DV1, DV2, the master brake cylinder HZ can act on both brake circuits BK1 and BK2. If the pressure is reduced by way of the opening of the valves ZAV or FV, the two connecting switching valves open automatically, without dedicated electrical actuation thereof, owing to the acting pressure difference. Here, the two connecting valves BP1 and BP2 are hydraulically connected to one another by means of the connecting line VLa.

Correspondingly, the pressure supply device DV2 in the second brake circuit BK2 acts via the hydraulic lines 2 and 5 and via the valves BP2 and BP1 into the hydraulic line 4, and from there via the switching valves SV to the wheel cylinders RZ. In the event of failure of the brake circuit BK in wheel brakes RB, the valves SV, BP1 and BP2 are closed in advance by diagnosis, and prevent a failure of the pressure supply. Here, all valves, for example SV, BP1, BP2, are to be regarded as safety-critical with regard to dormant faults, because the hydraulic medium flowing through the valves contains dirt particles that could prevent a closure of the valve, and the valves therefore leak. In the present case, for example in the event of failure of one switching valve SV, one brake circuit may duly fail. The other brake circuit is however safeguarded by the interconnection of the two valves BP1 and BP2. There would have to be a triple fault here, that is to say both valves BP1 and BP2 would additionally have to fail, for a total failure to occur. At least one brake circuit is thus reliably protected against double faults and prevents a total brake failure. Safety with respect to double faults, if dormant faults can occur, is a crucial safety feature for SAD and FAD. This also includes maintaining the pressure supply or the brake force booster in the event of a brake circuit failure.

Here, the pressure supply device DV2 can assist the other pressure supply device DV1 in the case of a rapid pressure build-up or a pressure build-up above 120 bar, and/or can perform the pressure supply in the event of fading by means of continuous delivery and/or for the ABS function, and/or, in the event of failure of the other pressure supply DV1, can jointly perform the function thereof.

It is likewise possible that the pressure supply device DV1 performs the pressure build-up for pressure ranges lower than or equal to 120 bar and for the ABS function. In the event of failure of the pressure supply device DV2, if the pressure supply device DV2 is designed only for a maximum pressure of 120 bar, only this maximum pressure of 120 bar is available for both brake circuits.

With the connecting valves BP1 and/or BP2 closed, the two pressure supply devices DV1 and DV2 can set, or set by closed-loop control, the pressure in their brake circuits BK1 and BK2 independently of one another.

The pedal movement is measured by means of redundant pedal travel sensors (PS), which also act on a force-travel sensor (KWS) measuring element according to WO2012/059175 A1. The pressure supply device DV1 is controlled with the signal from the pedal travel sensors, wherein the piston control causes the volume flow in the hydraulic main line 1 in the brake circuit BK1 and via the redundant valves BP1 and BP2 into the brake circuit BK2. The pressure supply device DV1 may be designed so as to act only up to the locking pressure for example 120 bar. Higher pressures are then delivered by the pressure supply device DV2, which conveys volume into the brake circuit BK2 and via the redundant valves BP1 and BP2 into brake circuit BK1. The pressure supply device DV2 may be a pump with continuous delivery action. If the brake system is poorly ventilated or if vapor bubbles develop, resulting in a greater volume requirement, this is detected by way of the known pressure volume characteristic curve (p-v characteristic curve), with the result that the pressure supply device DV2 already takes effect at lower pressures. With regard to the pedal actuation, it must additionally be stated that this moves the piston Ko, which, by way of the pressure proportional to the pedal force, acts on the known travel simulator WS and thus determines the pedal characteristic. The travel simulator WS can commonly be shut off by means of a valve, in particular in the fall-back level in the case of failed pressure supply devices. In the case of redundant pressure supply devices, this is no longer relevant owing to the very low probability of failure.

The master brake cylinder HZ can be connected via the line 3 to the brake circuits BK1 or BK2, wherein the valve FV is arranged in the line 3 for the purposes of closing same. This connection is effective only in the fall-back level. If the line is connected to the connecting line of the two switching valves BP1 and BP2, the two valves BP1 and BP2 form a further redundancy. A conventional connection from valve FV directly into one of the two brake circuits BK1, BK2 would, in the case of a leaking valve FV, have the result that the brake circuit and thus the pressure supply act on the master cylinder (HZ) piston, which conventionally leads to the pressure supply being shut off.

In the event of a failure of a brake circuit in the wheel cylinder, the corresponding inlet valve EV or switching valve SV is conventionally closed in order that the failed wheel circuit is eliminated. A leaking inlet valve EV/switching valve SV (dormant fault) causes the brake circuit or the entire pressure supply to fail. Here, too, the valves BP2 and BP1 provide additional safety, such that the pressure supply does not fail. A failure of the brake circuit BK1 owing to a non-functioning switching valve SV means a failure of the pressure supply DV1, whereby the pressure supply to all still-functioning wheel brakes is performed by means of the other pressure supply device DV2.

A further failure can result from a fault of the check valve RV1 in the second brake circuit. The failure of the pressure supply DV2 can be prevented here by means of a redundant check valve RV2. A throttle Dr downstream of the check valve RV2 with a small pressure flow allows diagnosis, for example by way of a pressure drop.

A central outlet valve ZAV is required for the closed-loop ABS control or for the pressure reduction with the second pressure supply device DV2. Here, the volume flow additionally passes via the valves BP1 or BP2, such that a leaking central outlet valve ZAV is not critical for normal operation because, in the event of failure of the central discharge valve ZAV, the pressure control is performed by means of pressure supply devices DV1 and DV2. Furthermore, the fault, even dormant, is identified by central outlet valve ZAV immediately from a change in pressure or increased volume delivery of the pressure supply device DV1. During normal braking up to approximately 120 bar, the pressure supply DV acts in both brake circuits BK via open valves BP1 and BP2. For extreme safety requirements, a redundant discharge valve ZAVr may also be installed in the line to the reservoir VB.

A pressure reduction without actuation of the pressure supply device DV1 is possible through control of the central outlet valve ZAV. With the valves BP1 and BP2 open, and with the valves SV open, the pressure in the wheel cylinders RB1, RB2, RB3 and RB4 can be reduced by opening of the central outlet valve ZAV. It is advantageous here to stop or reduce the delivery rate of the pressure supply device DV2. The pressure reduction gradients over time in the wheel cylinders RB1, RB2, RB2 and RB4 are determined here inter alia by the geometry of the central outlet valve ZAV. One possibility for influencing these pressure reduction gradients is offered by pulse width modulation, PWM, of the electrical voltage in the control of the valves BP1 and BP2. If the pressure reduction gradients in the wheel cylinders RB1 and RB2 are to be smaller than in the case of a fully open valve BP1, the valve BP1 is controlled with PWM, with the central outlet valve ZAV open, such that the pressure reduction gradients correspond or approximate to those of the setpoint values. Here, the quality of the closed-loop control of the pressure reduction can be improved with the pressure sensor DG2. Alternatively, the pressure reduction gradients in the wheel cylinders RB1 and RB2 can be set individually by PWM control of the valves SV in brake circuit BK1, with the valves BP1 and ZAV open. A similar situation applies to the pressure reduction gradients in the wheel cylinders RB3 and RB4. If the pressure reduction gradients in the wheel cylinders RB3 and RB4 are to be smaller than in the case of a fully open valve BP2, the valve BP2 is controlled with PWM of the electrical voltage, with the central outlet valve ZAV open, such that the pressure reduction gradients correspond or approximate to those of the setpoint values. Here, the quality of the closed-loop control of the pressure reduction can be improved with the pressure sensor DG. Alternatively, the pressure reduction gradients in the wheel cylinders RB3 and RB4 can be set individually by PWM control of the valves SV in brake circuit BK2, with the valves BP2 and ZAV open. In this way, very comfortable and quiet braking operations of the vehicle can be implemented even without actuation of the pressure supply device DV1. If wheel-specific pressure reduction gradients in the wheel cylinders are required, for example in the case of torque vectoring during recuperation operation, then these can, with the central outlet valve ZAV open, be implemented using the known multiplex method with the PWM control of the valves BP1 and BP2 and by switching of the valves SV. A further possibility for realizing these wheel-specific pressure reduction gradients is offered by PWM in the switching valve (SV) control, with the valves BP1, BP2 and ZAV open. Simultaneous pressure reductions with individual pressure reduction gradients for each wheel cylinder RB1, RB2, RB3 and RB4 can thus be performed. As an alternative to the PWM control of the valves, closed-loop current control may also be used for the valve control.

Failures in the master brake cylinder HZ and travel simulator WS are normally caused by the seals. In the case of the master brake cylinder HZ, an additional seal D3 with a throttle may be used in the return line to the reservoir VB in order to be able to diagnose the failure of a seal at an early point in time. A leak can thus be identified by means of the pedal stroke sensors from a small additional pedal movement. The low loading in the case of SAD and FAD must be taken into consideration.

In many systems, for the diagnosis of the seals, a solenoid valve which is open when electrically deenergized is incorporated in the return line, which solenoid valve is closed for the purposes of diagnosis. In this case, pressure is conducted into the master brake cylinder HZ from the pressure supply device DV1 via the valves PD1, BP1 and EV. The diagnosis is performed by way of a pressure change at a constant piston position, or a change in the piston position at a constant pressure. As an alternative, a combination of throttle and check valve may also be used here to save costs. The throttle is dimensioned such that a leakage flow through the seal leads to only a slight displacement of the pedal within a normal braking time of approximately 10 seconds.

The same solution is also used in the case of the WS piston with redundant seal, with diagnosis, as above for seal D3, by way of the pedal movement. Furthermore, control of the brake force boosting remains possible even with these failed seals, albeit with a changed pedal characteristic. Here, too, there is an extremely low failure rate for the failure of two seals, almost in the range of <$10^{-10}$/year. The pressure supply device DV1 may also be equipped with redundant seals, as described above in the case of the master brake cylinder HZ, with seal D6, with a throttle between seal D6 and seal D5. If the suction valve is connected directly to the connection on valve PD1, then the suction commences immediately with the return stroke of the piston, with the advantage that a high suction power is provided even at low temperatures. A failure or leakage of the switching valve SV causes failure of the pressure supply DV in limit cases. A compromise lies in the connection of the switching valve SV at approximately 60% of the stroke. This means that 40% of the stroke is possible without the effect of a leaking switching valve SV, and at the same time a suction action is possible in the normal temperature range. With the small restriction mentioned above, the volume delivery of the piston is ensured by redundancy. Furthermore, the motor may be controlled by means of a redundant 2×3-phase winding, such that the pressure supply devices DV fail only as a result of a blocking ball-screw drive KGT.

The ABS function by means of multiplex operation MUX and the pressure supply device DV1 is performed as described in WO 2006/111393 A1. Extended MUX functions result from a central discharge valve ZAV. If, during the pressure build-up $p_{build-up}$ in the brake circuit BK1, a pressure reduction $p_{reduction}$ is necessary at the same time in the other brake circuit BK2, this is performed by means of the central discharge valve ZAV and simultaneously closed valve BP1. In this way, the multiplex system MUX is subjected to load only by two wheel brakes RB1, RB2 in the brake circuit BK1, that is to say a pressure build-up $P_{build-up}$ and pressure reduction $P_{reduction}$ cannot take place in the wheel brakes RB1 and RB2 of the brake circuit BK1 simultaneously. Alternatively, a discharge valve AV1, AV2 in the respective brake circuit may be used for the purposes of pressure reduction $P_{reduction}$ in order to relieve the MUX of load. Here, the discharge valve AV1, AV2 may be arranged or connected either between the switching valve SV and a connecting switching valve BP1, BP2 or else between the wheel brake and the associated switching valve SV, such that a direct pressure reduction $P_{reduction}$ can take place by dissipation via the discharge valve to a reservoir VB. This is expedient in particular for the pressure reduction $P_{reduction}$ in the front wheels. The central discharge valve ZAV is not required in this alternative.

The ABS function by means of the second pressure supply device DV2 is slightly restricted in this case, in particular no $P_{build-up}$ during $P_{reduction}$. Fully individual closed-loop ABS control is nevertheless possible. The infrequent use of the pressure supply device DV2 at pressures greater than 120 bar and in the event of failure of the first pressure supply device DV1 must be taken into consideration.

What is typical for the abovementioned MUX operation is the closed-loop pressure control, also in the case of ABS, by means of the volume measurement and by means of the piston movement of the pressure supply device DV1, also taking into consideration the pressure-volume characteristic curve (p-v characteristic curve). In the case of a simple eccentric piston pump, this can be performed not by way of the piston movement but by way of the delivery time=volume, with additional rotational speed measurement and, if necessary, pressure measurement. A metering of volume for the pressure build-up is thus also possible. Here, in the case of the pressure build-up $p_{build-up}$, a serial and non-simultaneous pressure build-up $p_{build-up}$ in the individual wheel brakes is advantageous. Here, the valve dimensioning and the back pressure on the valve must be taken into consideration, in particular in the case of the valves BP1 and BP2 in the case of rapid pressure build-up in the wheel circuits. The back pressure of the abovementioned valves acts as a pressure difference between the brake circuits BK1 and BK2. This can be reduced considerably if both pressure supply devices DV1 and DV2 are activated in this operating state. Here, a single-circuit gear pump is also expedient instead of a piston pump. Here, the pressure reduction $p_{reduction}$ and pressure build-up $p_{build-up}$ may also be performed by means of the gear pump. For this purpose, instead of the check valve RV, a valve MV (not shown) is required in the return line to the reservoir VB. Full MUX operation is thus also possible with the second pressure supply device DV2.

The open-loop and closed-loop control device ECU is a constituent part of the entire system and of the packaging. A redundant or partially redundant ECU is required for fail-safe functioning. This partially redundant ECU may also be used in addition to the redundant ECU for particular functions. In any case, the valves are or should be driven redundantly by means of separate valve drivers and isolation switches, which shut off a failed valve driver.

A redundant on-board electrical system connection is also necessary for the redundancy of the open-loop and closed-loop control device ECU. A connection with 48V may also be used for the connection of the motors. The advantage of 48V is higher dynamics. In the event of failure of the motor of the pressure supply device DV1 at 48V, emergency operation with 12V with approximately 50% power is possible with reduced dynamics and cost savings. For this purpose, a configuration of the motor for 24V, for example, is necessary.

A pressure transducer DG is preferably used in brake circuit BK2, and possibly also in brake circuit BK1. In the event of failure of the pressure transducer, closed-loop pressure control can be performed by way of the current measurement of the motors and position control of the piston using the p-v characteristic curve.

Alternatively, the hydraulic connection from the pressure supply device of the brake circuit BK2—as illustrated in FIG. 1b and denoted by X—to the inner connecting line VLa of the valves BP1 and BP2 may be realized. In this alternative, the pressure supply device DV2 no longer acts directly into the brake circuit BK2. This has an advantage in the event of failure of the valves BP2, SV and of the pressure supply device DV1. Here, the failure of pressure supply devices DV1 and DV2 can be avoided by virtue of DV2 acting into brake circuit BK1 with valves BP2 and PD1 closed. However, triple faults with a minimum failure probability of approximately $<5 \cdot 10^{-18}$/year must be taken into consideration in relation to the failure of the wheel circuit if $<5 \cdot 10^{-6}$/year, that is to say 5 faults in one million vehicles per year. This is opposed by numerous disadvantages; for example, in the event of failure of the valve FV (for example leaking), the pressure supply in the brake circuit BK2 also fails.

In the pressure line of a pressure supply device DV1, DV2, there may be arranged a pressure relief valve ÜV1, ÜV2 for protecting the drive, in particular the spindle and/or the ball-screw drive, which pressure relief valve opens for example at approximately 120 bar.

FIG. 1a shows the function of the pressure supply devices DV1 and DV2 during the pressure build-up $p_{build-up}$ and pressure reduction $p_{reduction}$. The piston of DV1 generates the volume that passes into the brake circuit BK1 via the valve PD1 and into the brake circuit BK2 via valves BP1 and BP2. The pressure is measured by means of the pressure transducer DG. For the pressure reduction $p_{reduction}$, the piston moves back, with a corresponding backflow of the volume. In the case of higher pressures or failure of pressure supply device DV1, pressure supply device DV2 takes effect and delivers the volume directly into brake circuit BK2 and via the valves BP2 and BP1 in brake circuit BK2; PD1 is closed. The pressure reduction $p_{reduction}$ can be performed by means of the pressure supply device DV1, wherein the volume greater than 120 bar flows out via the breather hole. Alternatively, the pressure reduction $p_{reduction}$ may be performed via the central discharge valve ZAV. Here, too, the pressure measurement and closed-loop control is performed by means of the pressure transducer DG. In the event of failure of the pressure transducer DG, the current and travel measurement of the piston may also be used as a substitute signal. A further advantage is the possibility of assisting the EPB parking brake during parking. One or both pressure supply devices DV1 and DV2 can be used to generate a preload in the parking brake, such that its electric motor can be configured to be reduced in terms of power and torque. Owing to redundant pressure supply devices, this use is sufficiently fail-safe.

FIG. 1b shows the effect of faults/failure. In the event of failure of the brake circuit BK1 in the wheel cylinder or feed line, the switching valve SV is closed. In the event of a double fault in the wheel brake and in the switching valve SV, brake circuit BK1 fails and pressure is generated in the brake circuit BK1 by means of the pressure supply device DV2. An analogous situation applies in the event of failure of a wheel brake RB and/or valve SV in brake circuit BK2. Then, the pressure supply device DV1 generates the pressure in brake circuit BK1. The safety function of the redundant valves BP1 and BP2 is of great importance here.

FIG. 1c shows the effect in the event of failure of both pressure supply devices DV1 and DV2, for example in the event of an on-board electrical system failure. Here, the pressure is generated by means of the pedal actuation and piston. The volume passes via the valves FV, BP1 into brake circuit BK1 and FV, BP2 into brake circuit BK2 and travel simulator WS. Mention should be made of the fail-safe master brake cylinder HZ with the redundant seals, which has the potential to reduce the demands on the redundancy of the onboard electrical system in order to save costs. Here, a partial redundancy in the ECU may be used for various functions such as simplified closed-loop ABS control.

The embodiments show that, through logical use of redundancy with diagnosis of dormant faults in the event of leaks, exceptional fail safety is realized. The optimized valve arrangement results in less expenditure than in the case of a conventional and fail-safe system. Double faults with simultaneous occurrence are extremely rare, that is to say in the range of $10^{-9}$/year. In the case of extremely important double faults such as a brake circuit failure in the wheel brake or in the switching valve SV, even a total brake failure can be avoided, because one fully effective brake circuit is still available for the brake force boosting.

FIG. 2 shows the possibility, mentioned in the introduction, of modular braking with a separate master brake cylinder HZ in relation to the main unit, which brings advantages in terms of installation and noise transmission to the bulkhead. A disadvantage is a separate reservoir, possibly with a level transducer and a small ECU for recording the sensor signals and transmitting the signals to the central ECU.

A further problem arises if, for the diagnosis of the master brake cylinder HZ, additional volume passes from the pressure supply device DV1 via the throttle into the reservoir VB2. The solution to this is diagnosis at a low pressure of <5 bar. In the case of the pressure measurement that is necessary for the diagnosis in any case, no pressure reduction is an indication that the reservoir VB is already full. Here, the lid of the reservoir VB has an integrated check valve RV. Furthermore, after the diagnosis, a certain volume is drawn out of the reservoir VB by the pressure supply DV. Thus, the additional level sensor NS can be omitted, and a diagnosis of the master brake cylinder HZ is possible.

FIG. 3a shows the structural design of the first and second embodiment as a so-called 1-box system with attachment of the actuation unit to the pressure supply.

FIG. 3b shows the structural design of the third embodiment as a so-called distributed system, where the pressure supply and actuation unit are separate and are connected via a hydraulic line. In relation to FIG. 3a, this embodiment has the disadvantage that the costs are higher and a fault-susceptible hydraulic line is required, but has the advantages that a space requirement on the bulkhead is minimal and that noise sources on the bulkhead can be minimized. Furthermore, this embodiment forms a basis for a solution with an electric pedal.

FIG. 4 the fourth embodiment of the hydraulic system according to the invention with separate electric pedal. the pressure supply devices DV1 and DV2 with valve arrangement. Here, an electric brake pedal, a so-called electric pedal, with travel simulator (WS) pedal travel sensors with a small sensor ECU and force-travel sensor KWS without a hydraulically acting master brake cylinder HZ are combined in one unit. This has advantages if the installation volume in the engine compartment is small or the noise requirements are high. Instead of the master brake cylinder HZ with reservoir VB (not shown in FIG. 5), the arrangement with pedal actuation with travel simulator WS, so-called electric pedal, may also be used. The signals of the pedal travel sensors are processed in a sensor ECU and fed to the central ECU. For level 5, a brake switch may also be used as an alternative to the electric pedal.

The abovementioned unit has the 2-circuit reservoir VB with float and level sensor NS, which may be integrated in the central open-loop and closed-loop control unit ECU. This level sensor NS should likewise be of redundant configuration and continuously measure the level, because a loss of volume owing to a leak is quickly detected in this way. Since, in this case, the connection to the master brake cylinder HZ is omitted, and thus the fall-back level with respect to the master brake cylinder HZ in the event of the failure of both pressure supply devices DV1 and DV2 and/or of the on-board electrical system is also omitted, the valves BP1 and BP2 are preferably designed as valves which are open when electrically deenergized.

FIG. 4a shows the structural design of the fourth embodiment. Here an electric pedal without hydraulics and the pressure supply are separate units. The driver demand from the sensor ECU is transmitted via redundant signal lines SL1 and SL2 to the pressure supply. The embodiment is only a small step away from a solution for ADS, where the actuation unit is completely omitted and the setpoint pressure is specified by means of a central control unit of a driverless vehicle.

FIG. 5 shows the basic elements of a closed-loop-controllable brake system for vehicles, composed of the master brake cylinder SHZ with travel simulator WS and reservoir VB and also two pressure supply devices DV1 and DV2. The pressure supply device DV1, for its part, has the rotary pump Pa, the brushless direct-current motor Ma, the rotor angle encoder WGa of the motor Ma with electrical connection Wea, the winding connection 3a of the direct-current motor Ma, and the shunt 4a of the direct-current motor Ma. The pressure supply device DV2 has the rotary pump Pb, the direct-current motor Mb, the winding connection 3b of the direct-current motor Mb and the shunt 4b of the direct-current motor Mb. Both rotary pumps Pa and Pb of the two pressure supply devices DV1 and DV2 are, in particular 1-circuit, rotary pumps. The rotary pump Pa may preferably be a gear pump. The rotary pump Pa of the pressure supply device DV1 is preferably driven by a brushless direct-current motor (EC motor) Ma, whereas the rotary pump Pb of the pressure supply device DV2 is driven by a direct-current motor Mb, preferably with brushes. The rotary pump Pb may be a simple 1-circuit gear pump or a 1-circuit piston pump.

The pressure supply device DV1 is designed for the conventional locking pressure, wherein the locking pressure is to be understood as the minimum pressure at which all vehicle wheels lock. A locking pressure of 120 bar is common for most vehicles. Overheated brakes (fading) or overloading of the vehicle can cause the locking pressure to increase, such that the maximum pressure that can be achieved with the pressure supply device DV1, for example 120 bar, is not sufficient to lock all of the vehicle wheels. For this reason, the pressure supply device DV2 is designed for higher pressures than the pressure supply device DV1, for example for 200 bar. Both pressure supply devices DV1 and DV2 can individually or jointly generate the wheel brake cylinder pressure, which, by means of suitable valve positions of a valve circuit to the wheel brake cylinders RZ1, RZ2, RZ3, RZ4, for example with ABS, is set, or set by closed-loop control, in the respective wheel brake cylinders. This is, in principle, prior art. It is however the intention for the pressure supply unit according to the invention for a hydraulic system or brake system to have a high level of fail safety, for example for highly automated (HAD) or fully automated driving (FAD). For this purpose, all failure-relevant components should be taken into consideration, such as valves, sensors, seals, motors and brake circuits. The following components or hydraulic connections should therefore advantageously be designed to be fail-safe:

(1) connection from the pressure supply device DV1 provided for the first brake circuit BK1 to the second brake circuit BK2;

(2) connection from the pressure supply device DV2 provided for the second brake circuit BK2 to the first brake circuit BK1;
(3) connection from the pressure chamber of the master brake cylinder SHZ via the switching valve FV to the brake circuits BK1, BK2 via the bypass valves BP1 and BP2;
(4) connection of switching valve PD1 and bypass valve BP1 to the wheel brake cylinders RZ1 and RZ2 via the respective switching valves SV assigned to the wheel brakes;
(5) connection of bypass valve BP2 to the wheel brake cylinders RZ3 and RZ4 via the respective switching valves SV assigned to the wheel brakes;
(6) connection from a brake circuit BK1, BK2 to the reservoir VB;
(7) connections between brake circuits BK1, BK2 to the wheel brake cylinders RZ.

These hydraulic connections, with possible failure-inducing faults of the individual components, will be described below.

The pressure supply device DV1 acts from the brake circuit BK1 into the brake circuit BK2 via the hydraulic lines 1, 2 and 5 and via the switching valves SV to the wheel brake cylinders RZ1, RZ2, RZ3, RZ4. In the prior art, only a single bypass valve is used for this purpose. Here, a failure of the single bypass valve can cause a total brake failure if there is also a dormant fault in a further valve. A "dormant fault" is to be understood to mean an individual fault that does not itself have an effect on the braking action, but which may have an effect on the braking action when combined with another fault. The invention therefore provides two redundant bypass valves BP1 and BP2 in order to allow the connection to the brake circuit BK2 from the first pressure supply device DV1. Dormant faults of the bypass valves BP1 and BP2 are identified by means of pressure transducers DG in that, during a pressure change by means of the pressure supply device DV1, the bypass valves BP1 and BP2 are alternately closed in succession over a short period of time. During the closing phase of bypass valve BP1 or bypass valve BP2, the pressure in brake circuit BK2 must remain constant. In the event of failure of the first pressure supply device DV1, for example in the event of failure of the direct-current motor Ma, the imparting of a reaction to the brake circuit BK2 via the two redundant bypass valves BP1, BP2 and the switching valve PD1 is prevented. The bypass valves BP1 and BP2 are preferably valves which are open when electrically deenergized, in order that, in the event of failure of the pressure supply devices DV1 and DV2, the master brake cylinder SHZ can act on both brake circuits BK1 and BK2 via the open switching valve FV. If the pressure in the wheel brake cylinders RZ1, RZ2, RZ3 and RZ4 is to be reduced, this can be performed through the opening of the switching valves ZAV or FV. Here, the two connecting switching valves or bypass valves BP1 and BP2 can open automatically, without dedicated electrical activation, owing to the pressure difference acting across these bypass valves BP1 and BP2, whereby, in the event of a fault, for example in the event of a failure of the control electronics of the two bypass valves BP1 and BP2, it is ensured that a pressure reduction is possible and, for example, locking of the wheels is reliably prevented.

Correspondingly, the pressure supply device DV2 in the second brake circuit BK2 acts via the hydraulic lines 2 and 5 and via the switching valves SV to the wheel brake cylinders RZ3 and RZ4, and via the bypass valves BP2 and BP1 into the hydraulic line 4, and from there via the switching valves SV to the wheel brake cylinders RZ1 and RZ2. A failure of the brake circuit BK1, for example owing to a leak of a seal in one of the wheel brake cylinders RZ1, RZ2, can be identified by diagnosis by means of one of the switching valves SV in the brake circuit BK1, wherein, then, the bypass valves BP1 and BP2 are closed, whereby a failure of the pressure supply device DV2 is prevented and a closed-loop or open-loop pressure control remains possible by means of the pressure supply device DV2 in the brake circuit BK2. A failure of the brake circuit BK2, for example owing to a leak of a seal in one wheel brake cylinder RZ3 or RZ4, can be identified by diagnosis by means of one of the switching valves SV in the brake circuit BK2, wherein, then, it is likewise the case that the bypass valves BP1 and BP2 are closed, whereby a failure of the pressure supply device DV1 is prevented and a closed-loop or open-loop pressure control remains possible by means of the pressure supply device DV1 in the brake circuit BK1. Here, leaks in all valves, for example SV, BP1, BP2, are to be regarded as being safety-critical as dormant faults. The hydraulic medium flowing through the valves contains dirt particles that can prevent a closure of the respective valve, thus causing the valves to leak. In the present case, although the brake circuit BK1 may fail for example in the event of failure of a seal of a wheel brake cylinder RZ1 or RZ2 and owing to the dormant fault of the associated switching valve SV, the brake circuit BK2 is however safeguarded by the interposition of the two bypass valves BP1 and BP2. Similarly, although the brake circuit BK2 may fail for example in the event of failure of a seal of a wheel brake cylinder RZ3 or RZ4 and owing to the dormant fault of the associated switching valve SV, the brake circuit BK1 is however likewise safeguarded by the interposition of the two bypass valves BP1 and BP2. There would have to be a triple fault here, that is to say both bypass valves BP1 and BP2 would additionally have to fail, for a total failure of both brake circuits BK1 and BK2 to occur. Each of the two brake circuits BK1 and BK2 is thus reliably protected against double faults and prevents a total brake failure. Safety with respect to double faults, if dormant faults can occur, is a crucial safety feature for SAD and FAD. This also includes the maintaining of the pressure supply or the brake booster in the event of a brake circuit failure.

Here, the pressure supply device DV2 can assist the other pressure supply device DV1 in the case of a rapid pressure build-up or a pressure build-up above for example 120 bar, and/or can perform the ABS function, and/or, in the event of failure of the other pressure supply device DV1, can also perform the function thereof. A pressure reduction may be performed here by means of a rotary pump Pa, Pb or, if present, also alternatively or at the same time by means of at least one outlet valve ZAV, AV1, AV2.

It is likewise possible that the pressure supply device DV1 performs the pressure build-up for pressure ranges lower than or equal to 120 bar and for the ABS function. The pressure reduction in one brake circuit is performed here by reversal of the direction of rotation of the rotary pump Pa. In the event of failure of the pressure supply device DV2, if the pressure supply device DV1 is designed only for a maximum pressure of for example 120 bar, only this maximum pressure of for example 120 bar is available for both brake circuits BK1 and BK2.

With the bypass valves BP1 and/or BP2 closed, the two pressure supply devices DV1 and DV2 can set, or set by closed-loop control, the pressure in their brake circuits BK1 and BK2 independently of one another. Here, too, the pressure reduction can be performed by means of the rotary pump Pa. However, if additional outlet valves ZAV, AV1, AV2 are present, it is also possible for the pressure in one or more wheel brakes to be reduced by means of these. It is thus also possible for a simultaneous pressure reduction to be performed by means of one rotary pump, for example Pa, for example in the wheel brake RZ1, by reversal of the direction of rotation of the rotary pump Pa, wherein, at the same time, the pressure for example in the wheel brake RZ3 is reduced by means of the rotary pump Pb or via an outlet valve AV2, ZAV.

The pedal movement is measured by means of redundant pedal travel sensors PS, which also act on a force-travel sensor (KWS) measuring element according to WO2012/059175 A1. The pressure supply device DV1 is controlled with the signals from the pedal travel sensors, wherein the rotary pump Pa causes the volume flow in the hydraulic line 1 in the brake circuit BK1 and via the redundant bypass valves BP1 and BP2 into the brake circuit BK2. The pressure supply device DV1 may be designed so as to act only up to the locking pressure for example 120 bar. For higher pressures, the pressure supply device DV2 then delivers volume into the brake circuit BK2 and via the redundant bypass valves BP1 and BP2, with the switching valve PD1 closed, into brake circuit BK1. The pressure supply device DV2 may be a pump with continuous delivery action. If the brake system is poorly ventilated or if vapor bubbles develop, resulting in a greater volume requirement, this is detected by way of the known pressure volume characteristic curve (p-v characteristic curve), with the result that the pressure supply device DV1 has to deliver more volume in order to attain a certain pressure in the wheel brake cylinders RZ1, RZ2, RZ3 and RZ4. During a pedal actuation, the piston Ko is moved, which, by way of the pressure proportional to the pedal force, acts on the known travel simulator WS and thus determines the pedal characteristic. The travel simulator WS can commonly be shut off by means of a valve, in particular in the fall-back level in the case of failed pressure supply devices DV1 and DV2.

In the case of redundant pressure supply devices, this is, in principle, no longer relevant owing to the very low probability of failure.

The master brake cylinder SHZ can be connected via the line 3 to the brake circuits BK1 or BK2, wherein the switching valve FV is arranged in the hydraulic line 3 for the purposes of closing same. This connection is only effective in the fall-back level, that is to say when both pressure supply devices DV1 and DV2 have failed. If the hydraulic line 3 is connected to the connecting line VLa of the two bypass valves BP1 and BP2, the two bypass valves BP1 and BP2 form a further redundancy. A conventional connection from the switching valve FV directly into one of the two brake circuits BK1, BK2 would, in the case of a leaking switching valve FV, have the result that the brake circuit and thus the pressure supply acts on the master cylinder (SHZ) piston Ko, which must directly result in the pressure supply being shut off.

A failure of the brake circuit BK2 may occur, for example in the case of a 1-circuit gear pump being used as a rotary pump Pb, owing to a leak of the check valve RV1. The failure of the pressure supply device DV2 can be prevented here by means of a redundant check valve RV2. A hydraulic connection between the two check valves RV1 and RV2 to the reservoir VB with the throttle Dr with small throughflow allows the diagnosis, for example by way of a measurable pressure drop.

A central outlet valve ZAV is required for the closed-loop ABS control or for the pressure reduction with the second pressure supply device DV2. Here, the volume flow additionally passes via the bypass valves BP1 or BP2, such that a leaking ZAV is not critical for normal operation because, if the central outlet valve ZAV is leaking, the pressure control in brake circuit BK1 is performed by means of the pressure supply device DV1 and the pressure control in brake circuit BK2 is performed by means of the pressure supply device DV2 for the pressure build-up. The pressure reduction in the brake circuit BK2 can still be performed via the bypass valve BP2 even if the outlet valve ZAV is leaking. Furthermore, the fault, even dormant, is identified by central outlet valve ZAV immediately from a change in pressure or increased volume delivery of the pressure supply device DV1.

During normal braking up to approximately 120 bar, the pressure supply device DV1 acts in both brake circuits BK1 and BK2 via opened bypass valves BP1 and BP2. For extreme safety requirements, it is also possible for a redundant outlet valve ZAVr to be installed in the hydraulic line 6 from the central outlet valve ZAV to the reservoir VB.

The ABS function by means of multiplex operation MUX and the pressure supply device DV1 is performed as described in WO 2006/111393 A1. However, in the case of the rotary pump, in particular in the form of a gear pump, the direction of rotation is reversed for the pressure reduction. Extended multiplex functions result from a central outlet valve ZAV. If, during the pressure buildup $p_{build-up}$ in the brake circuit BK1, a pressure reduction $p_{reduction}$ is necessary at the same time in the other brake circuit BK2, this pressure reduction is performed via the central outlet valve ZAV and with bypass valve BP1 simultaneously closed. In this way, the multiplex operation MUX is subjected to load only by two wheel brake cylinders RZ1 and RZ2 in the brake circuit BK1. For example, a pressure build-up $P_{build-up}$ in the wheel brake cylinder RZ1 and a pressure reduction $P_{reduction}$ in the wheel brake cylinder RZ2 of the brake circuit BK1 cannot take place at the same time. Alternatively, an outlet valve AV1 or AV2 in the respective brake circuit BK1 or BK2 may be used for the purposes of pressure reduction $P_{reduction}$ in order to relieve the multiplex operation MUX of load. Here, at one side, the outlet valve AV1 or AV2 may be arranged or connected either between a switching valve SV and a bypass valve BP1, BP2 or else between the wheel brake cylinder and the associated switching valve SV, and at the other side, said outlet valve may be connected to the reservoir VB, such that a direct pressure reduction $P_{reduction}$ can take place by dissipation via the outlet valve to the reservoir VB. This is expedient in particular for the pressure reduction $P_{reduction}$ in the wheel brake cylinders of the front wheels. The central outlet valve ZAV is not required in this alternative.

The ABS function by means of the second pressure supply device DV2 is slightly restricted in this case; in particular, no pressure build-up $P_{build-up}$ in one wheel brake cylinder is possible or provided during a pressure reduction $P_{reduction}$ in another wheel brake cylinder. Fully individual closed-loop ABS control is nevertheless possible. The infrequent use of the pressure supply device DV2 at pressures greater than 120 bar and in the event of failure of the first pressure supply device DV1 must be taken into consideration.

What is typical for the abovementioned multiplex operation MUX during ABS operation, for example, is that the closed-loop pressure control by means of the pressure supply device DV1 by way of the metering of volume, which is calculated by means of the rotor rotation or the rotor rotational angle of the rotary pump, which is measured by means of the rotor angle transducer WGa. The pressure-volume characteristic curve of the brake (p-v characteristic curve) may also be taken into consideration here.

If a simple eccentric piston pump is used as rotary pump Pb in the pressure supply device DV2, this can be performed not by way of the piston movement but by way of the delivery time, which is proportional to the delivered volume, with additional rotational speed measurement and possibly pressure measurement. A metering of volume for the pressure build-up is thus also possible by means of the pressure supply device DV2. Here, a serial and non-simultaneous pressure build-up $P_{build-up}$ in the individual wheel brake cylinders is advantageous.

Here, the valve dimensioning the back pressure on the valve must be taken into consideration, in particular in the case of the bypass valves BP1 and BP2 in the case of rapid pressure build-up $P_{build-up}$ in the brake circuits. The back pressure at the bypass valves BP1 and BP2 acts as a pressure difference between the brake circuits BK1 and BK2. This can be reduced considerably if both pressure supply devices DV1 and DV2 are activated in this operating state. Here, a 1-circuit gear pump in the pressure supply device DV2 is also expedient instead of a piston pump. Here, the pressure reduction $P_{reduction}$ and pressure build-up $P_{build-up}$ may also be performed by means of the gear pump. For this purpose, instead of the check valves RV1 and RV2, a switching valve (not shown) is required in the return line to the reservoir VB. Full multiplex operation MUX is thus also possible with the second pressure supply device DV2.

The open-loop and closed-loop control device ECU in housing B is a constituent part of the entire system and of the packaging. A redundant or partially redundant ECU is required for fail-safe functioning. This partially redundant ECU may also be used in addition to the redundant ECU for particular functions. In any case, the valves are or should be driven redundantly by means of separate valve drivers and isolation switches, which shut off a failed valve driver.

For redundancy of the open-loop and closed-loop control device ECU in housing B, a redundant on-board electrical system connection BN1 or BN2, or an auxiliary on-board electrical system connection with for example U-caps BN2', if the redundant on-board electrical system connection BN2 is not available, is also required. A connection with 48V may also be used for the connection of the motors. The advantage of 48V is higher dynamics. In the event of failure of the motor of the pressure supply device DV1 at 48V, emergency operation with 12V with approximately 50% power is possible with reduced dynamics, which advantageously results in a cost saving. For this purpose, a configuration of the motor for 24V, for example, is necessary.

A pressure transducer DG is preferably used in brake circuit BK2, and possibly also in brake circuit BK1 (as illustrated by dashed lines). In the event of failure of the pressure transducer, closed-loop pressure control can be performed by way of current measurement of the motors and angle control of the rotors, in particular in the form of toothed gears, by way of the pressure-volume characteristic curve (p-v characteristic curve).

In the hydraulic line 2 of the pressure supply device DV2, there may furthermore be arranged a pressure relief valve ÜV for protecting the drive, which pressure relief valve opens for example at approximately 120 bar.

FIG. 5a shows one possible embodiment of the packaging or construction according to the invention for the pressure supply unit according to the invention. Here, the following main function blocks must be taken into consideration:

A hydraulics housing HCU
   B electrical control unit ECU
   C master cylinder HZ, optionally with travel simulator WS, reservoir VB and/or pedal sensor PS These main function blocks are described in detail in DE 10 2015 104 246 A1 and DE 10 2016 105 232 A1, wherein these documents can serve for explaining details that are not described here.

The hydraulics housing A is a main component of the pressure supply unit according to the invention, in which at least one—preferably all—rotary pump(s) Pa, Pb, Pb1 of at least one pressure supply device DV1, DV2 is or are arranged. If motor housings are provided for the rotary pumps Pa, Pb, then these motor housings Ma, Mb of the rotary pumps Pa, Pb may be arranged either in or on the housing A.

In the housing A, there may also be positioned the mechanical and/or electrical connections to the housing B of the electrical control unit ECU. Furthermore, in the housing A, there may be arranged solenoid valves, check valves and/or pressure transducers, in particular with a connection to the master brake cylinder HZ, the wheel brake cylinders RZ1-RZ4 and the pressure supply devices DV1, DV2. Both the solenoid valves and the pressure transducers require a connection to the ECU. The single or tandem master brake cylinder HZ, THZ can also be jointly arranged in the housing A.

The housing or the block B is arranged closely, in particular so as to bear over a large area, against the housing A, and/or is connected thereto, and contains the components and (plug) contacts of the control electronics, which are arranged on a printed circuit board PCB. The plug connections to the on-board electrical system are likewise arranged or fastened in or on the housing B.

The control unit ECU may be of fully redundant or only part-redundant (hereinafter referred to as partially redundant) configuration. For example, a double on-board electrical system connection or a second redundant circuit board may be provided.

The hydraulic connecting lines to the brake circuits and wheel brake cylinders RZ1-RZ4 are connected to the housing A. The hydraulic connections for the connecting lines may be arranged laterally or on a front side on the housing A.

It is also possible that the hydraulic connections are arranged on the housing A at an angle, for example at 45° with respect to the horizontal, such that a favorable connection angle is realized and/or the pressure supply unit is as small and compact as possible.

If the single or tandem master brake cylinder HZ, THZ is not also arranged in the housing A, a further housing C must be provided for this. A travel simulator WS and/or pedal sensor PS that may be provided may additionally be contained in this housing C. Here, there is an electrical and/or mechanical interface to the housing B and/or the electronic control unit ECU.

The housings A and C are preferably arranged one behind the other in the direction of the axis $A_{HZ}$, wherein the housing B is arranged adjacent to the housing A in the axial direction $A_{HZ}$. The axes Aa, Ab of the motors Ma, Mb are preferably oriented perpendicular to $A_{HZ}$.

The filler cap of the reservoir VB may be arranged in front of the housings A, B and C or else laterally with respect to and/or above the center thereof.

FIG. 5a shows the view from the front or in the direction of axis $A_{HZ}$. The rotary pumps Pa, Pb are arranged in the housing A. The electric motors Ma, Mb for the rotary pumps Pa, Pb may, by way of their housings, adjoin or be fastened to the housing A. It is however likewise possible that the motors Ma, Mb are also arranged in the housing A. The motor axes Aa and Ab are preferably oriented parallel to one another. As shown in FIG. 5a, the motor axes Aa, Ab are arranged perpendicular to the axis $A_{HZ}$ of the master brake cylinder.

The solenoid valves MV and the electrical and mechanical connections 3a, 3b and 5c to the ECU or to the housing B are likewise arranged in the housing A.

FIG. 5a likewise shows the alternative front-side connection of the hydraulic connections for the wheel brake cylinders RZ1-RZ4. The position of the inlet connector for the reservoir VB on the front or in the middle is also illustrated. Altogether, the illustrated arrangement of the individual components constitutes a compact structural unit with very small dimensions.

The block C or the housing C may be arranged separately from the housings A and B, for example directly on the bulkhead of the vehicle with a connection to the pedal interface. The blocks A and B may be arranged at a suitable location in the assembly compartment or engine compartment, in which case the axes Aa, Ab of the motors Ma, Mb no longer need to be arranged at right angles to the axis of the master brake cylinder HZ, THZ.

FIG. 3b shows a perspective view of the pressure supply unit as per FIGS. 3 and 3a. The housing A is arranged adjacent to the housing B, wherein the housing C lies against the front faces A1, B1 of the housings A and B. The filler neck $VB_E$ for the reservoir VB is arranged on the front side and above the housings A, B, C.

FIG. 6a shows a rapid pressure build-up by means of both pressure supplies DV1 and DV2 at two axles. The pressure build-up at the front axle $p_{VA}$ is performed by means of the pressure supply DV1 with corresponding variable closed-loop admission pressure control $p_{DV1}$ up to the setpoint pressure $P_{setpoint, VA}$. The admission pressure determines the pressure difference and thus the pressure gradient; here, the solenoid valves between the pressure supply and the wheel brake are fully open. At the same time, the pressure build-up at the rear axle $p_{HA}$ is performed by means of the second pressure supply DV2 with corresponding closed-loop admission pressure control (not shown) up to the 2nd setpoint pressure $p_{setpoint, HA}$. The pressure build-up of the pressure supply DV2 is performed here in the classic manner as in the case of standard closed-loop brake control systems (ABS, ESP) with piston pumps, wherein at least one solenoid valve (for example central outlet valve ZAV) is used for the closed-loop pressure control. For the control of the pressure change, the solenoid valve is optionally controlled in clocked or pulse-width-modulated fashion.

Owing to the simultaneous pressure build-up, either the time to locking pressure (TTL) can be significantly reduced in relation to systems with only one pressure supply, or the pressure supplies can be downsized in terms of power, whereby the difference in costs between two pressure supplies and only one pressure supply can be greatly reduced.

FIG. 6b shows the course of the pressure build-up for all wheels $p_{R1-R4}$ up to the first pressure p1 and in the further course up to the maximum pressure p2, for example in the event of fading, that is to say an intense temperature increase at the wheel brakes. Here, in a first step, the pressure up to a first pressure level p1 is generated by means of the pressure supply DV1, and the higher pressure $p_2$ is then generated by means of the pressure supply DV2. In this phase of the further pressure increase from p1 to p2, the pressure supply DV1 is isolated from the brake circuit BK1 by means of the valve PD1, and the pressure in the pressure supply DV1 is reduced by backward movement of the piston. The subsequent pressure reduction (not illustrated) is then performed via outlet valves in the upper pressure range or via the PPC control of the pressure supply DV1 in the lower pressure range.

FIG. 6c shows the exemplary pressure build-up in the case of steering interventions or torque vectoring at one of the rear axle HA at the wheel brakes R3. Such an intervention is used, for example, when a steering intervention is performed at the front axle by way of the electric power steering system during cornering, and this steering intervention is assisted by generation of a controlled braking torque and of a yaw moment at a rear wheel $p_{R3}$. This intervention can replace the effect of a rear-axle steering unit (for example electric rear-axle steering system), because the pressure control is performed very precisely by variable pressure control of the pressure supply DV1 (PPC closed-loop control). Here, solenoid valves between pressure supply DV1 and wheel brake R3 are operated so as to open in order to reduce the flow resistance, and the braking torque intervention is controlled exclusively by means of the pressure supply DV1.

FIG. 6d shows the pressure build-up during braking operation with different recuperation power at two axles, wherein one or more electric motor(s) is/are provided for the recuperation of braking energy at the rear axle and/or front axle. Owing to the braking torque by means of the electric motor, a low pressure is required at the rear axle, which may additionally vary owing to different axle load distribution and maximum torque output of the electric motor during deceleration. As described in the method in FIG. 6c, the control of the different pressure profile is performed by way of PPC closed-loop pressure control, that is to say variable admission pressure control by means of a pressure supply (DV1), wherein, at one axle, the solenoid valves of the wheel brakes are open, and at the rear axle, the solenoid valves of the wheel brakes are operated with PWM control.

FIG. 6e shows the pressure reduction in recuperation operation at two axles. Similarly to the situation in FIGS. 6c and 6d, the admission pressure control is performed by means of the pressure supply DV1. Different pressure profiles are realized through PWM control of solenoid valves at one axle (VA). These may be switching valves at the wheels or connecting valves BP1/BP2 of the brake circuit BK2 with the pressure supply. In this case, by contrast to the illustration in FIG. 1, RB3 and RB4 are wheel brakes of the front axle. If the hydraulic circuit of FIG. 1 is used (wheel brakes RB3 and RB4 at rear axle, wheel brakes RB1, RB2) at rear axle, is an additional isolation valve, as illustrated in FIG. 1, in order that the wheel pressure of the front axle can be reduced at the same time as the wheel pressure of the rear axle and the pressure at the front axle is higher than the pressure at the rear axle. For this purpose, PWM control of the valve TV is performed.

FIG. 6f shows an alternative to the pressure reduction method discussed in FIGS. 6d and 6e. Here, the closed-loop pressure control is performed by way of the sequential MUX operation. Here, the admission pressure of the pressure supply DV1 is controlled such that the pressure at the rear axle is reduced first, followed by that at the front axle. Therefore, after the completion of the pressure reduction at the rear axle, the pressure is increased again in order that the pressure difference is not too high upon opening. The pressure at the rear axle is then reduced again. A time delay $\Delta t_{MUX}$ arises here, which in reality is however very short and can scarcely be resolved by the driver. The advantage of this method is that there is no need for valves that have to be PWM-controlled, and a standardized configuration of the hydraulics is possible. For example, even vehicles with diagonal brake circuits can be operated for the pressure build-up and pressure reduction.

FIG. 6g shows a first variant of the closed-loop pressure reduction control in ABS closed-loop control operation with 2-channel MUX operation with 2 outlet valves AV1 and AV2 at 2 wheel brakes. Here, outlet valves AV1 and AV2 are preferably at wheel brakes of the front axle, where a further degree of freedom in the pressure reduction primarily has an advantageous effect owing to the higher dynamics requirement. In a MUX closed-loop control cycle, the pressures in the wheel brakes $p_{R1}$ and $p_{R2}$ are reduced by admission pressure control of the pressure supply DV1, wherein the switching valve at the wheel brake R2 is operated with PWM clocking. This allows a simultaneous pressure reduction with pressure gradient control. At the same time, the pressure at the wheel brakes R3 and R4 can be reduced via outlet valves. In this case, outlet valve AV1 is attached to the wheel brake R4 rather than the wheel brake R1 (FIG. 1).

FIG. 6h shows a second variant of the closed-loop pressure reduction control in ABS closed-loop control operation with 3-channel MUX operation with one outlet valve AV1 at one wheel brake. Here, analogously to FIG. 6g, the pressure in the wheel brakes R1, R2 and R3 is reduced, whilst wheel brake R4 is operated only later by way of MUX closed-loop control. This results in a slight delay in the MUX cycle time $\Delta t_{MUX}$.

FIG. 6i shows a third variant of the closed-loop pressure reduction control in ABS closed-loop control operation with 2-channel MUX operation in the brake circuit BK1 and pressure reduction operation with central outlet valves ZAV, for example in the brake circuit BK2. Here, during the MUX pressure reduction in the wheel brakes R1 and R2, the pressure in the wheel brakes R3 and R4 is reduced via the central outlet valve ZAV. The time of the pressure reduction in the wheel brakes R3 and R4 is flexible in terms of time, and the pressure gradient can be controlled by way of PWM operation.

LIST OF REFERENCE DESIGNATIONS 1-11 Hydraulic lines
BK1 Brake circuit 1
BK2 Brake circuit 2
HZ Master cylinder
BP1 Bypass valve 1 (SO) or connecting switching valve
BP2 Bypass valve 2 (SO) or connecting switching valve
VB Reservoir
WS Travel simulator
WA Travel simulator cut-off valve
ECU Electrical control unit
DV Pressure supply
DG Pressure transducer
D1-D7 Seals
AV1, AV2 Outlet valves (SG)
ZAV Central outlet valve (SG)
SV Switching valve (SO)
RZ Wheel cylinder
RB1-RB4 Wheel brakes
NV Level transducer
PD1 Switching valve (SG)
SO Open when electrically deenergized
SG Closed when electrically deenergized
SV Suction valve
RV Check valve
KWS Force-travel measuring element
Sp Spindle with ball-screw drive
Ko Piston
Dr Throttle
D Damper element
PS Pedal travel sensors
P Pedal actuation
NS Level sensor
TV Isolation valve
V1-V4 Valves of the double-action piston DHK
VL Hydraulic connecting line for connecting the two brake circuits BK1 and BK2
VLa Inner connecting line for connecting the two connecting switching valves BP1 and BP2
ÜV1, ÜV2 Pressure relief valve

What is claimed is:

1. A device for generating brake force in a vehicle having a brake system, the brake system comprising:
at least two electromotively driven pressure supply devices, wherein one of the pressure supply devices comprises a piston pump or gear pump driven by an electromotive drive and is enabled to provide continuous volume delivery,
first hydraulic brake circuit and a second hydraulic brake circuit, each with at least one or two hydraulically acting wheel brakes, wherein pressure is enabled to both be built up and reduced in at least one of the first hydraulic brake circuit or the second hydraulic brake circuits by means of at least one of the pressure supply devices,
at least one valve arrangement, having valves for wheel-specific setting of brake pressures and/or for isolation or connection of the wheel brakes from or to respective brake circuits and/or at least one of the pressure supply devices, and
at least one electronic open-loop and closed-loop control unit arranged to control the brake system or of parts thereof,
wherein each brake circuit has a respective hydraulic main line, via which the wheel brakes are connected or connectable to each of the two pressure supply devices, and
wherein the brake system further comprises:
an electric brake pedal as an actuation unit, with a sensor electronic control unit (S-ECU) and control by means of a central control unit (CCU), wherein a driver demand from the S-ECU is transmitted via at least two redundant signal lines via the CCU to at least one of the pressure supply devices, or
a master brake piston-cylinder unit, actuatable by an actuation unit in the form of a brake pedal, having only one piston, wherein one pressure chamber of the master brake piston-cylinder unit is connected to a travel simulator and is connectable to at least one of the hydraulic brake circuits via a hydraulic line, and wherein at least one controlled valve of the at least one valve arrangement is provided for shutting off the hydraulic line,
wherein the hydraulic lines, solenoid valves of the at least one valve arrangement, and hydraulic elements for pressure generation of the pressure supply devices are arranged in one structural unit or one hydraulics housing, and wherein the actuation unit is arranged in a separate housing.

2. The device as claimed in claim 1, wherein pressure is enabled to be built up by means of a gear pump of one of the at least two pressure supply devices in at least one direction of rotation, and wherein pressure is enabled to be reduced by means of the gear pump by reversal of the direction of rotation of the gear pump.

3. The device as claimed in claim 1, wherein anti-lock braking system (ABS) and/or electronic stability control (ESP) operation with at least axle-specific or brake circuit-specific closed-loop control is enabled by means of each one of the pressure supply devices independently of functionality of the other one of the pressure supply devices.

4. The device as claimed in claim 1, further comprising a connecting line connecting the first and second hydraulic brake circuits, wherein the connecting line is enabled be shut off by at least one connecting valve of the at least one valve arrangement.

5. The device as claimed in claim 1, wherein the wheel brakes are connected to the pressure supply devices in each case via switching valves, which are open when electrically deenergized, of the at least one valve arrangement, wherein the switching valves are connected to the wheel brakes so as to open automatically owing to pressure in the wheel brakes.

6. A method of using the device as claimed in claim 5, the method comprising:
  building up and reducing pressure (a) using an electrically driven piston-cylinder unit of one of the at least two pressure supply devices, using closed-loop pressure control of back-and-forth movement of the piston of the electrically driven piston-cylinder unit, by means of current control and/or piston travel control, taking into consideration a pressure-volume characteristic curve, or (b) using an electrically driven gear pump of one of the at least two pressure supply devices via current control and/or rotational speed control of the drive of the pump, with readjustment based on leakage in the gear pump,
  wherein, the building up and reducing pressure includes at least partially simultaneously generating different pressure profiles for different wheel brakes or brake circuits by using pulse-width modulation (PWM) control of solenoid valves, which are open when electrically deenergized, of the at least one valve arrangement.

7. The device as claimed in claim 1, wherein an axis of the drive of a first one of the pressure supply devices is arranged perpendicular or parallel to an axis of the drive of a second one of the pressure supply devices.

8. A method of using the device as claimed in claim 7, the method comprising:
  building up and reducing pressure (a) using an electrically driven piston-cylinder unit of one of the at least two pressure supply devices, using closed-loop pressure control of back-and-forth movement of the piston of the electrically driven piston-cylinder unit, by means of current control and/or piston travel control, taking into consideration a pressure-volume characteristic curve, or (b) using an electrically driven gear pump of one of the at least two pressure supply devices via current control and/or rotational speed control of the drive of the pump, with readjustment based on leakage in the gear pump,
  wherein, the building up and reducing pressure includes at least partially simultaneously generating different pressure profiles for different wheel brakes or brake circuits by using pulse-width modulation (PWM) control of solenoid valves, which are open when electrically deenergized, of the at least one valve arrangement.

9. A method of using the device as claimed in claim 1, the method comprising:
  building up and reducing pressure (a) using an electrically driven piston-cylinder unit of one of the at least two pressure supply devices, using closed-loop pressure control of back-and-forth movement of the piston of the electrically driven piston-cylinder unit, by means of current control and/or piston travel control, taking into consideration a pressure-volume characteristic curve, or (b) using an electrically driven gear pump of one of the at least two pressure supply devices via current control and/or rotational speed control of the drive of the pump, with readjustment based on leakage in the gear pump.

10. The method as claimed in claim 9, wherein building up and reducing pressure includes building up and/or reducing pressure in at least two wheel brakes simultaneously, in a temporally overlapping manner, or in succession by means of the electrically driven gear pump and/or a motor-driven piston-cylinder unit, wherein, by means of a closed switching valve, the pressure in the wheel brake belonging to the closed switching valve is held.

11. The method as claimed in claim 9, further including performing torque vectoring using one or both pressure supply devices through wheel-specific closed-loop pressure control of one or multiple wheels, wherein the torque vectoring is maintained even in an event of failure of one of the pressure supply devices.

12. The method as claimed in claim 11, further comprising performing an emergency steering function in an event of failure of an electric power steering system of a vehicle including the device.

13. The method as claimed in claim 9, further comprising performing axle-specific recuperation control using one or both of the pressure supply devices through axle-specific closed-loop pressure control of multiple axles during the building up and reducing pressure, wherein the axle-specific closed-loop pressure control is maintained via the connecting line in an event of failure of one of the pressure supply devices.

14. The method as claimed in claim 9, further comprising performing a brake pressure intervention only at one wheel by way of admission pressure control using a piston-cylinder unit or a gear pump of one of the at least two pressure supply devices, using closed-loop pressure control of back-and-forth movement of the piston of the electrically driven piston-cylinder unit and/or closed-loop current-rotational speed control of the electromotive drive of the piston pump or gear pump.

* * * * *